US011855695B1

(12) United States Patent
Rofougaran et al.

(10) Patent No.: US 11,855,695 B1
(45) Date of Patent: Dec. 26, 2023

(54) COMMUNICATION SYSTEM AND METHOD FOR CLOUD-ASSISTED FREE-SPACE OPTICAL BACKHAUL

(71) Applicant: WIRELESS PHOTONICS LLC, Newport Beach, CA (US)

(72) Inventors: Ahmadreza Rofougaran, Newport Beach, CA (US); Bahram Jalali, Los Angeles, CA (US); Mehdi Hatamian, Mission Viejo, CA (US); Arman Rofougaran, Newport Coast, CA (US); Milan Rofougaran, Newport Coast, CA (US)

(73) Assignee: WIRELESS PHOTONICS LLC, Newport Beach, CA (US)

( * ) Notice: Subject to any disclaimer, the term of this patent is extended or adjusted under 35 U.S.C. 154(b) by 0 days.

(21) Appl. No.: 18/305,868

(22) Filed: Apr. 24, 2023

(51) Int. Cl.
*H04B 10/50* (2013.01)
*H04B 10/114* (2013.01)

(52) U.S. Cl.
CPC ....... *H04B 10/503* (2013.01); *H04B 10/1143* (2013.01); *H04B 10/1149* (2013.01)

(58) Field of Classification Search
None
See application file for complete search history.

(56) References Cited

U.S. PATENT DOCUMENTS

| 10,117,316 | B1 * | 10/2018 | Stout | H05B 47/19 |
|---|---|---|---|---|
| 2005/0158059 | A1 * | 7/2005 | Vaananen | H04B 10/1121 398/183 |
| 2006/0056855 | A1 * | 3/2006 | Nakagawa | G09F 9/33 398/183 |
| 2014/0161466 | A1 * | 6/2014 | Riza | H04B 10/1149 398/119 |
| 2014/0270749 | A1 * | 9/2014 | Miniscalco | H04B 10/11 398/5 |
| 2018/0351643 | A1 * | 12/2018 | Kaag | H04B 10/116 |

* cited by examiner

*Primary Examiner* — David W Lambert
(74) *Attorney, Agent, or Firm* — CHIP LAW GROUP

(57) ABSTRACT

A communication system that includes a cloud server that obtains first sensor data associated with a defined indoor area and second sensor data associated with each of a plurality of optical nodes in defined indoor area. The plurality of optical nodes includes a master communication device, a plurality of optical routing devices, and one or more service communication devices. The cloud server further obtains location coordinates of each of the plurality of optical nodes. The cloud server then causes the master communication device to form a laser beam-based wireless communication network in the defined indoor area. A free-space optical backhaul is constructed by establishing a point-to-point free-space laser link between each pair of optical nodes of the plurality of optical nodes and a RF supervisory link is established between each pair of optical nodes of the plurality of optical nodes for a network monitoring and control function.

21 Claims, 18 Drawing Sheets

COMMUNICATION SYSTEM AND METHOD FOR CLOUD-ASSISTED FREE-SPACE OPTICAL BACKHAUL

CROSS-REFERENCE TO RELATED APPLICATIONS/INCORPORATION BY REFERENCE

None.

FIELD OF TECHNOLOGY

Certain embodiments of the disclosure relate to a wireless communication system. More specifically, certain embodiments of the disclosure relate to a communication system (e.g., an advanced wireless local area network system) with a cloud-assisted intelligent free-space optical backhaul and a communication method for a cloud-assisted intelligent free-space optical backhaul for an ultra-flexible and an ultra-reliable laser beam based wireless communication, for example, in an indoor area.

BACKGROUND

Conventional communication devices, such as a wireless access point (WAP) or wireless routers, are often used in an indoor area to extend the wireless coverage of an existing Wi-Fi® signal to access Internet and to increase the numbers of end devices (users) that are capable to use Wi-Fi® may connect to the WAP. However, Wi-Fi® signals by virtue of the limitation of the Wi-Fi® communication protocol have a defined range beyond which the connectivity is lost. Thus, a large number of WAPs or range extenders are used in the indoor area (e.g., an enterprise building, a home) if wireless coverage for Wi-Fi® signals are to be extended. Moreover, under ideal conditions, typically 2.4 GHz Wi-Fi® supports up to 450 Mbps or 600 Mbps, and 5 GHz Wi-Fi® supports up to 1300 Mbps. Recently, progress has been made in developing Wi-Fi® communication in 6 GHz band, for example, for Wi-Fi® 6, 6E, Wi-Fi 7 etc., for increasing data throughput. However, the technical issue of limited coverage area and signal attenuation with increasing distance from a Wi-Fi® signal broadcast device remains. This is the reason why Ethernet cables are still widely used as primary connectors in a conventional Ethernet Local Area Network (LAN) to connect different routers, switches, hub, and gateway devices in an enterprise to provide a reliable connectivity. Ethernet connects any computer or other electronic device to its network as long as the device has an Ethernet adapter or a network card. Since all the network devices need to be connected to its individual power source, and cables need to run through walls, re-designing an enterprise LAN often becomes a herculean task. For instance, network maintenance may require changing or replacing cables and costly intermediate network devices that often causes damage to the walls and installation points for deployment or re-deployment.

Currently, certain attempts have been made to solve the technical issue of limited coverage area and signal attenuation with increasing distance from a Wi-Fi® signal broadcast device and to avoid the Ethernet cables. For example, certain conventional home mesh Wi-Fi® systems also exists that provide a comparatively wider coverage than the single Wi-Fi® signal broadcast device in an indoor area. Such conventional home mesh Wi-Fi® systems operate by broadcasting from the main router to several satellite routers, which in turn broadcast to its client devices. In this topology, the communication between the main router connected to the Internet and the satellite routers fed by the main router, is carried by the Backhaul. While the backhaul connections can be done with physical cables which offer wider bandwidth than a Wi-Fi® band, cable installation and reconfiguration are extremely costly, unaesthetic, and slow. Thus, there are many technical challenges associated with existing wireless communication systems commonly used in an indoor area. In a first example, there is the technical issue of how to provide full coverage with high signal-to-noise (SNR) in an indoor area with high-speed data connectivity to end-user devices without the need to deploy intermediate routers that process signals, for example, for signal amplification and routing. In another example, the reach and performance of existing systems (e.g., home mesh Wi-Fi® systems) are fundamentally limited by the bandwidth of a dedicated band, and by the number of intermediate routers (i.e., satellite routers) that the data must traverse in order to reach remote end-user devices.

In a third example, currently, certain communication devices, such as Internet-of-Things (IoT) devices depend on high-speed Internet access to the cloud to send sensor data and receive instructions (e.g., artificial intelligence-based processing models) from cloud either directly or via a gateway device. The number of wireless sensors and IoT devices are rapidly increasing with the increase in smart homes, smart offices, enterprises, etc. Existing communication systems and Wi-Fi® standards are unbale to handle such massive number of wireless sensors and IoT devices and their quality-of-service (QoS) requirements. In such cases, it is extremely difficult and technically challenging to support these end user devices, where latency and signal noise are other technical problem with existing communication systems and network architecture when operating in a sub 10 GHz frequency, and such latency increases when more wireless access points or relay nodes or routers are introduced in the network to extend the communication range.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A communication system and method for a cloud-assisted free-space optical backhaul for an ultra-flexible and an ultra-reliable laser beam based wireless communication, in an indoor area, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
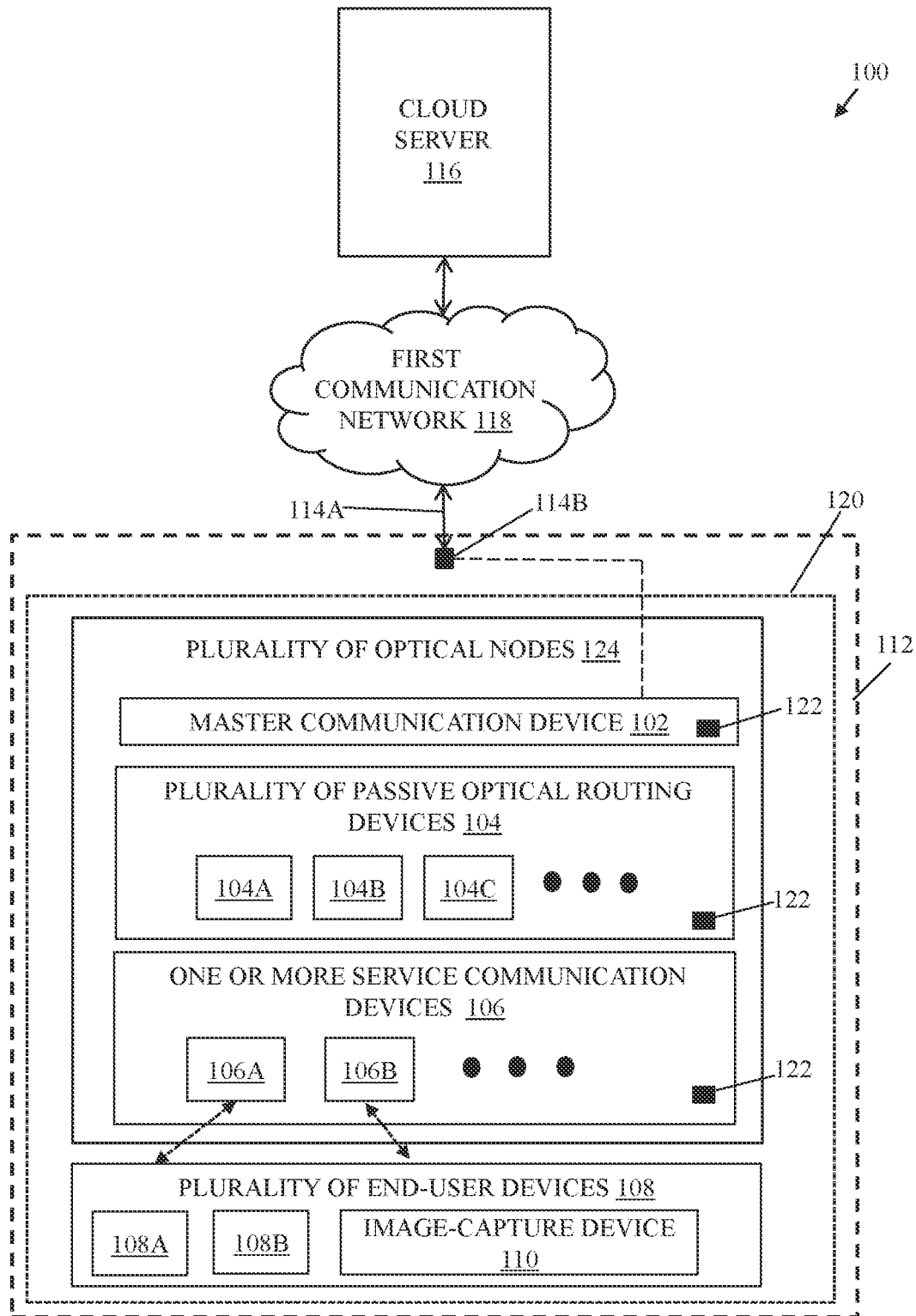
FIG. 1 is a diagram illustrating an exemplary communication system, in accordance with an exemplary embodiment of the disclosure.

Certain embodiments of the disclosure may be found in a communication system (e.g., an advanced wireless local area network system) with a cloud-assisted intelligent free-space optical backhaul and a communication method for a cloud-assisted intelligent free-space optical backhaul. The disclosed communication system may be an advanced wireless local area network system that is an intelligent hybrid of photonics and radio frequency (RF) communication with cloud-assisted intelligent free-space optical backhaul for ultra-flexible and ultra-reliable laser beam based wireless communication, for example, in an indoor area. The disclosed communication system smartly employs first sensor data associated with the defined indoor area, second sensor data associated with a plurality of optical nodes of the communication system, and the location coordinates of each of the plurality of optical nodes, to cause a master communication device of the communication system to form a laser beam-based wireless communication network in the defined indoor area. A free-space optical backhaul is constructed in the laser beam-based wireless communication network by establishing a point-to-point free-space laser link between each pair of optical nodes of the plurality of optical nodes. This ensures not only the inherent benefits of optical communication like enhanced data security, comparably high throughput as compared to RF only communication but unlike conventional systems, significantly improves continuity of data traffic in both upstream and downstream communication. Moreover, due to much smaller wavelength as compared to RF communication, optical beams diffract (i.e., spread) much less than RF beams, and thus for point-to-point communication, optical free-space communication is more energy efficient than the RF communication.

Furthermore, in an example, in the conventional GPON star topology, an optical spitter may be connected to an optical fiber cable, in which upstream traffic is not continuous but composed of bursts (data bursts) as each user is given a time slot on which data can be transmitted. Typically, there are an optical line terminal (OLT), a number of optical network units (ONUs) or optical network terminals (ONTs) near end users, as well as the conventional optical splitter. For downstream communication in the conventional optical networks like GPON, OLT sends frames of data to the conventional optical splitter continuously, and the conventional optical splitter sends the same set of frames to each ONU, and ONU filters out only frames specific to an end-user device and discards all other frames.

The disclosed communication system solves the above technical problem of the conventional GPON based systems, by constructing a free-space optical in the laser beam-based wireless communication network for actual data communication and establishing a radio frequency (RF) supervisory link between each pair of optical nodes of the plurality of optical nodes for a network monitoring and control function. This results in provisioning a full coverage with significantly improved SNR in the indoor area with high-speed data connectivity across all nooks and corners of the indoor area. There is no need to deploy intermediate RF routers that process signals, for example, for signal amplification and routing. Furthermore, unlike the conventional Wi-Fi® systems, the reach and performance of the communication system are not affected by the extent of area that is to be covered, for example, in an enterprise interior space.

The intelligent hybrid of photonics and radio frequency (RF) communication with cloud-assisted intelligent free-space optical backhaul not only improves network redundancy and network scalability but also enables almost near zero latency communication and an always-connected experience. Generally, optical beams and RF beams both travel at the speed of light, so the latency for free-space travel may be almost the same. The network redundancy refers to a mechanism or a way to provide multiple paths for traffic, so that data can keep flowing even in the event of a failure, and thus high network redundancy means high reliability. The term network scalability refers to an ability of a communication network to handle increasing workloads in a cost-effective and sustainable way, for example, by expanding the network's bandwidth capacity and supporting its physical expansion to new physical areas. Beneficially, the disclosed communication system and communication method can handle and serve massive number of wireless sensors and IoT devices and meet their quality-of-service (QoS) requirements. The communication system is designed in such a way that the communication range can be extended without any compromise in signal quality and data throughput rate. In fact, the communication system improves data transfer rates between at least two communication devices as compared to existing wireless systems (e.g., conventional wireless local area networks). In the following description, reference is made to the accompanying drawings, which form a part hereof, and in which is shown, by way of illustration, various embodiments of the present disclosure.

FIG. 1 is a diagram illustrating an exemplary communication system, in accordance with an exemplary embodiment of the disclosure. With reference to FIG. 1, there is shown a communication system 100 that may include a master communication device 102, a plurality of optical routing devices 104 (i.e., passive intermediate optical nodes), one or more service communication devices 106, a plurality of end-user devices 108 in a defined indoor area 112. The plurality of end-user devices 108, such as end-user devices 108A and 108B, may include one or more user equipment (UEs) and an image-capture device 110. There is further shown a data source 114 connected to the master communication device 102. In an implementation, the communication system 100 may include a cloud server 116 that is communicatively coupled to the master communication device 102 directly or via the data source 114. There is further shown a first communication network 118 (e.g., Internet) and a second communication network 120 (i.e., a laser beam based wireless communication network). In an implementation, each optical node (i.e., each of the plurality of optical routing devices 104, the master communication device 102, and each of the one or more service communication devices 106) may include one or more sensors 122.

Each of the master communication device 102 and the one or more service communication devices 106 may be a wireless access point or a wireless router, a home gateway device, a fixed wireless access (FWA) device, or a network controller.

Each of the plurality of optical routing devices 104 may be mounted on a ceiling surface or a wall surface. The plurality of optical routing devices 104 may be passive optical deflectors and in some cases may also include free-space optical beam splitters, and free-space optical beam combiners. In an implementation, each of the plurality of optical routing devices 104 may have one or more laser beam handling regions to handle either one or two laser beams for downstream and upstream data communication (in the downstream path and upstream path) and at least one laser beam for charging purpose, for example, by optical wireless power transmission. The downstream path refers to communication from the master communication device 102 towards the one or more service communication devices 106. The upstream path refers to communication from the end-user devices to the one or more service communication devices 106 and further to the master communication device 102. The master communication device 102 may be a modified and intelligent wireless access point that may use an existing Wi-Fi® signal in the RF medium to control one or more of the plurality of optical routing devices 104 whereas may employ laser beams to form the second communication network 120 (i.e., the laser beam based communication network) to wirelessly communicate data in a cascaded structure or a mesh structure to reach to the one or more service communication devices 106 via the plurality of optical routing devices 104. Each of the plurality of optical routing devices 104 may be a battery-operated device, which is easy to deploy in the defined indoor area 112. Further, each of the plurality of optical routing devices 104 may not only be capable of performing the deflection function by deflecting one or more laser beams but also may be configured to perform passive power splitting or combining (e.g., using Dichroic mirrors), passive polarization splitting or combining, and/or passive laser beam wavelength splitting or combining (e.g., using wavelength division multiplexing (WDM).

The plurality of end-user devices 108 may include user equipment (UEs), or other consumer electronic devices, such as the image-capture device 110. Each of one or more UEs, such as the end-user devices 108A and 108B, may correspond to a telecommunication hardware used by an end-user to communicate. Alternatively stated, the end-user devices 108A and 108B, may refer to a combination of a mobile equipment and subscriber identity module (SIM). Examples of the one or more UEs may include, but are not limited to a smartphone, a virtual reality headset, an augment reality device, a wireless modem, a satellite television set-top box, a VoIP station, or any other customized hardware for telecommunication and Internet connectivity. In an implementation, one of more of the plurality of end-user devices 108, such as a smartphone, may have a laser network control application, installed therein. The application may allow an administrator to monitor and reconfigure the laser-beam based wireless communication network via the laser network control application installed in the smartphone.

The defined indoor area 112 may be an indoor area of an enterprise, an apartment, a building, or other indoor area of a building.

The data source 114A may be a medium through which a backhaul connection is provided to the master communication device 102. Examples of the data source 114A may be a fiber optic cable, a high-speed XG communication wireless link, where "XG" refers to 5G or 6G, or a laser-based beam from an external communication device, such as an XG-enabled small cell or an XG-enabled repeater device located in an outdoor area. The modem 114B may be a gateway device or a Wi-Fi® modem that combines the functionality of a modem and a router for Internet connectivity.

The cloud server 116 includes suitable logic, circuitry, and interfaces that may be configured to communicate with the master communication device 102. In an example, the cloud server 116 may be a remote management server that is managed by a third party different from the service providers associated different cellular or wireless carrier networks or Internet service providers. In another example, the cloud server 116 may be a remote management server or a data center that is managed by a third party, or jointly managed, or managed in coordination and association with one or more of the cellular or wireless carrier networks or Internet service providers. In an implementation, the cloud server 116 may be a master cloud server or a master machine that is a part of a data center that controls an array of other cloud servers communicatively coupled to it, for load balancing, running customized applications, and efficient data management.

The first communication network 118 may include a medium through which the cloud server 116 and the master communication device 102 may communicate with each other. The master communication device 102 may be configured to obtain a first signal (e.g., data signal) from the data source 114A or the modem 114B coupled to the first communication network 118. The data source 114A or the modem 114B may be used to provide an Internet connection via the first communication network 118 from an Internet service provider or from a core network of a telecommunication network. Examples of the first communication network 118 may include, but are not limited to, at least one of a Transmission Control Protocol and Internet Protocol (TCP/IP), Hypertext Transfer Protocol (HTTP), the Internet, a cloud network, an optical fiber, a coaxial cable, or other backhaul connectivity medium.

The second communication network 120 refers to a laser beam-based wireless communication network formed by the master communication device 102 in association with the plurality of optical routing devices 104 and the one or more service communication devices 106.

The one or more sensors 122 may be provided at each optical node (i.e., each of the plurality of optical routing devices 104, the master communication device 102, and each of the one or more service communication devices 106). In some cases, some sensors of the one or more sensors 122 may be deployed external to the optical node in the defined indoor area 112. Examples of the one or more sensors 122 may include but are not limited to magnetic and gravity field sensors, an electronic compass, accelerometers, one or more motorized altazimuth, one or more Micro Electronic Mechanical Systems (MEMS) motion sensor, gyroscopes, a gimbal, one or more image-capture devices, a geospatial sensor (e.g., a GPS sensor), and the like.

In accordance with an embodiment, the master communication device 102 may be provided at a first location in the defined indoor area 112. The master communication device 102 may be communicatively coupled to the cloud server 116 via the first communication network 118. In an implementation, the master communication device 102 may be connected to the data source 114A or the modem 114B. In another implementation, the master communication device 102 may be integrated with the modem 114B (i.e., the functionalities of a modem, such as a Wi-Fi® modem, may be integrated with the master communication device 102). A service communication device, such as the service communication device 106A, may be provided at a second location in the defined indoor area 112. In an implementation, the service communication device 106A may be provided at the second location where the signal strength is below a threshold value, for example less than 20 or 30 decibels. In certain scenarios, there may be no-line-of-sight (NLOS) between the master communication device 102 and the service communication device 106A. In some implementation, multiple service communication devices, such as the one or more service communication devices 106, may be provided in the defined indoor area 112, where the signal strength is below a threshold value, e.g., a low SNR value, such as less than 20 or 30 decibels. The threshold value may be a default threshold value pre-defined in the master communication device 102 or may be user-configurable value that may be defined by a user. For example, an application installed in a smartphone may be used to connect to the master communication device 102 and set or update the threshold value. Alternatively, the threshold value may be remotely configured at the master communication device 102 from the cloud server 116.

The plurality of optical routing devices 104 may be distributed at a plurality of locations in the defined indoor area 112 different from the first location and the second location. Advantageously, the plurality of optical routing devices 104 may be battery-operated optical nodes. In an implementation, one or more of the plurality of optical routing devices 104 may be placed on or integrated with an electromechanical turret (also referred to as "eyeball"). The communication system 100 integrates optical wireless links that are reconfigurable via the battery-operated optical routing devices, such as the plurality of optical routing devices 104, which routes data signals via laser beams (i.e., used for the optical wireless links) to different nodes, such as the one or more service communication devices 106, according to instructions provided by the master communication device 102 or the cloud server 116.

In operation, the cloud server 116 may be configured to cause at least the master communication device 102 to form a laser beam-based wireless communication network (i.e., the second communication network 120) in the defined indoor area 112. The forming of the laser beam-based wireless communication network in the defined indoor area 112 comprises constructing a free-space optical backhaul by establishing a point-to-point free-space laser link between each pair of optical nodes of the plurality of optical nodes 124 and further establishing a radio frequency (RF) supervisory link between each pair of optical nodes of the plurality of optical nodes 124 for a network monitoring and control function. The cloud server 116 smartly employs first sensor data associated with the defined indoor area, second sensor data associated with the plurality of optical nodes 124 of the communication system 100, and the location coordinates of each of the plurality of optical nodes 124 for the creation of the laser beam-based wireless communication network in the defined indoor area 112. The forming of the forming of the laser beam-based wireless communication network and its operation has been discussed in detail, for example, in FIGS. 5, 6A, 6B, 7A-7C, 8-11, and 12A-12C. This ensures not only the inherent benefits of optical communication like enhanced data security, comparably high throughput as compared to RF only communication but unlike conventional systems, significantly improves continuity of data traffic in both upstream and downstream communication. The intelligent hybrid of photonics and radio frequency (RF) communication with cloud-assisted intelligent free-space optical backhaul not only improves network redundancy and network scalability but also enables almost near zero latency communication and an always-connected experience. Beneficially, the communication system 100 can handle and serve massive number of wireless sensors and IoT devices and meet their quality-of-service (QoS) requirements. Unlike the conventional wireless communication systems, the communication system 100 is designed in such a way that the communication range can be extended without any compromise in signal quality and data throughput rate. In fact, the communication system 100 improves data transfer rates between at least two communication devices as compared to existing wireless systems (e.g., conventional Wi-Fi® systems).

Figure 2:
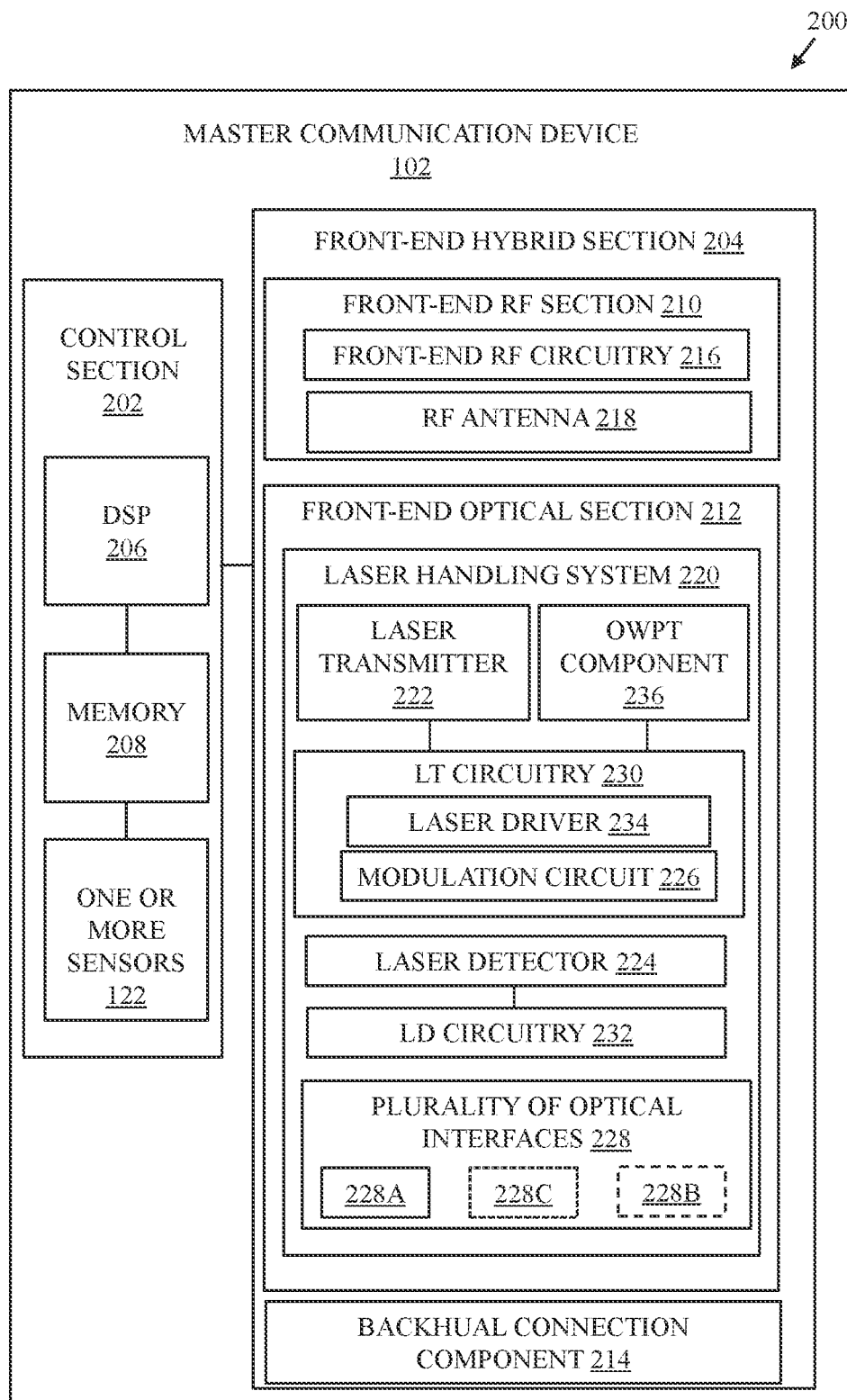
FIG. 2 is a block diagram that illustrates various components of an exemplary master communication device of a communication system, in accordance with an exemplary embodiment of the disclosure.

FIG. 2 is a block diagram illustrating various components of an exemplary master communication device of a communication system, in accordance with an exemplary embodiment of the disclosure. FIG. 2 is explained in conjunction with elements from FIG. 1. With reference to FIG.

2, there is shown a block diagram 200 of the master communication device 102. The master communication device 102 may include a control section 202 and a front-end hybrid section 204. The control section 202 may include a digital signal processor 206 (i.e., a DSP 206) and a memory 208. The control section 202 may be communicatively coupled to the front-end hybrid section 204. The front-end hybrid section 204 may include a front-end radio frequency (RF) section 210, a front-end optical section 212, and a backhaul connection component 214. The front-end RF section 210 may include front-end RF circuitry 216 and a RF antenna 218. The front-end optical section 212 may include a laser handling system 220, which includes a laser transmitter 222, a laser detector 224, a modulation circuit 226, and a plurality of optical interfaces 228.

In an implementation, the laser handling system 220 may further include a laser transmission (LT) circuitry 230 and a laser detector (LD) circuitry 232. The LT circuitry 230 may include free-space laser transmitter electronics, such as a laser driver 234, the modulation circuit 226, and in some exemplary implementations, additionally one or more beam-shaping optics (not shown). The LD circuitry 232 may include free-space laser detector electronics, such as a transimpedance amplifier (TIA) for converting the current signal from the laser detector 224 to a voltage signal, a limiting amplifier for amplifying and cleaning the signal, and a Clock and Data Recovery (CDR) component for recovering clock and data signals from the incoming signal. Additionally, in some implementation, the LD circuitry 232 may further include other components, such as a pre-amplifier, a post-amplifier, and an equalizer in conjunction with the TIA, limiting amplifier, and the CDR to increase overall performance of the communication system 100 depending on the use case. There is further shown an optical wireless power transmission (OWPT) component 236 in the laser handling system 220.

The DSP 206 include suitable logic, circuitry, and/or interfaces configured to control the laser handling system 220. In an implementation, the DSP 206 may be further configured to control the front-end RF circuitry 216. The master communication device 102 may be a programmable device, where the DSP 206 may execute instructions stored in the memory 208. Example of the implementation of the DSP 206 may include, but are not limited to an embedded processor, a field-programmable gate array (FPGA), a microcontroller, a specialized DSP, an Application-Specific Integrated Circuit (ASIC) processor, and/or other processors.

The memory 208 may include suitable logic, circuitry, and/or interfaces that may be configured to store instructions executable by the DSP 206. Examples of implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 202 may further include one or more other components, such as an analog to digital converter (ADC), a digital to analog (DAC) converter, a cellular modem, and the like, known in the art, which are omitted for brevity.

The front-end RF section 210 may include the front-end RF circuitry 216 and the RF antenna 218. The front-end RF circuitry 216 may include RF receiver circuitry and RF transmitter circuitry for Wi-Fi® communication, for example, in 2.4 GHz, 5 GHz, 6 GHz, or 7 GHz. In an example, the receiver circuitry may include a cascading receiver chain comprising various components (e.g., the RF antenna 218, a set of low noise amplifiers (LNA), a set of receiver front end phase shifters, and a set of power combiners) for the signal reception (not shown for brevity). Thus, the master communication device 102 may be a modified wireless access point (WAP) where at least one RF antenna is retained to communicate control signals to the plurality of optical routing devices 104 and the one or more service communication devices 106 to maintain service continuity in the laser beam based wireless communication network and where the front-end optical section 212 is connected at the other end to facilitate communication with different network nodes, such as the plurality of optical routing devices 104, via laser beams. The RF antenna 218 may be an RF antenna of the modified WAP.

The laser handling system 220 may include the laser transmitter 222, the laser detector 224, the modulation circuit 226, and the plurality of optical interfaces 228. The laser transmitter 222 may be configured to direct a first laser beam carrying the first data signal over the air in a downstream path to a service communication device, such as the service communication device 106A, directly or via the plurality of optical routing devices 104 based on the plurality of defined connectivity criterions. The laser transmitter 222 may be configured to focus the first laser beam into a narrow, collimated beam. The laser detector 224 may be configured to detect a second laser beam carrying one or more second data signals from the plurality of end-user devices 108 via the plurality of optical routing devices 104. The laser detector 224 detects the photons of light that are emitted by the second laser beam and converts them into an electrical signal that can be analyzed and data can be extracted from such electrical signal. The modulation circuit 226 may be configured to modulate the intensity and/or any one of: a phase, frequency, or a polarization of the first laser beam (generated by the laser transmitter 222) in accordance with the data to be transmitted. In an implementation, the laser transmitter 222 may include a laser diode that may be used to generate the first laser beam in which the first data signal may be modulated by the modulation circuit 226.

Beneficially, the plurality of optical interfaces 228 are special purpose physical interfaces to handle a plurality of laser beams concurrently segregating download and upload functions via a plurality of distinct laser beams. There may be three scenarios for implementation of the plurality of optical interfaces 228. In a first implementation, there may be one optical interface 228A to direct one laser beam for both downstream (Tx) and upstream communication (Rx) by modulating data by WDM. In a second implementation, there may be two optical interfaces 228A and 228B, where one optical interface 228A is used to direct a first laser beam for laser-based wireless communication in a non-visible light spectrum to form a wireless optical backhaul and the other optical interface 228C is used to direct a beacon laser beam in visible light spectrum to perform optical beam alignment, such as one or more optical routing devices of the plurality of optical routing devices 104 and/or the one or more service communication devices 106. Optionally, in some cases, beacon laser beam may also be used for wireless power delivery. In practice, the beacon laser beam may be a low power laser used for alignment whereas a different optical power laser beam may be used for wireless power delivery in practice. The reason is that the high-power laser may not have suitable beam shape needed for alignment in some cases. In a third implementation, there may be three optical interfaces, such as the optical interfaces 228A, 228B, and 228C. In such a case, at least one optical interface, such as an optical interface 228A, may be coupled to the laser transmitter 222 to focus the first laser beam in a defined beam width, such as into a narrow, collimated beam. Another optical interface, such as an optical interface 228B, may be coupled to the laser detector 224 to receive a focused narrow beam over the air, for example, from one of the plurality of optical routing device 104. In the third implementation, each of the optical interface 228A and the optical interface 228B may be configured to handle laser beams in non-visible light spectrum for free-space data communication in the laser-beam based wireless network, such as the second communication network 120, whereas the optical interface 228C may be configured to handle a laser beam (i.e., a beacon laser) in a visible light spectrum (e.g., 400-700 nm or 800 nm wavelength) for an optical beam alignment and optical wireless power transmission purpose. The DSP 206 may be further configured to control emission of a third laser beam (e.g., may also be referred to as a beacon laser beam or a power laser) via the optical interface 228C over-the-air for an optical wireless power transmission to remotely charge the rechargeable battery 314 (FIGS. 3A and 3C) of each of the plurality of optical routing devices 104 (e.g., passive optical deflectors or passive free-space optical routers for free-space communication (Not optical fiber routers)). For example, when the third laser beam strikes one of the plurality of optical routing devices 104, the third laser beam may be deflected further to other optical routing devices causing each rechargeable battery of each of the plurality of optical routing devices 104 to be charged wirelessly via an optical medium. In an implementation, the optical interface 228C may be placed in the middle of the other two optical interfaces 228A and 228B. In another implementation, the optical interface 228C may be positioned nearest the mounting surface (e.g., the ceiling surface) in the order: the optical interface 228C followed by optical interfaces 228A and 228B in a vertical alignment or a horizontal alignment or at other positions without limiting the scope of the disclosure.

The backhaul connection component 214 may include ports to connect to wired mediums, such as a coaxial cable, a fiber optic cable and the like, to receive input, for backhaul connectivity, for example, to Internet (i.e., the first communication network 118), and provide output to the laser handling system 220. The backhaul connection component 214 may be configured to convert the first data signal received as the optical signal or the RF signal to an electrical signal and pass data in the form of the electrical signal to the laser handling system 220 where it is modulated to a laser beam, such as the first laser beam, for over-the-air laser beam based wireless communication.

The LT circuitry 230 may include the laser driver 234, the modulation circuit 226, or one or more beam shaping optical components. The laser driver 234 may be configured to provide the electrical current needed to operate the laser transmitter 222, such as a laser diode. The laser driver 234 may be used to operate the laser transmitter 222 to direct a laser beam over-the-air within its specified current range, providing stable and reliable operation. The laser driver 234 drives the laser diode by converting a low-voltage, low-current signal into a high-voltage, high-current signal that can drive the laser diode. The one or more beam shaping optical components may be used to shape the transmitted laser beam to match the requirements of the communication system 100, for example, by collimating the laser beam, expanding, focusing the laser beam, or adjusting the laser beam's divergence angle so that the laser beam is properly coupled into an optical communication channel and propagates with minimal dispersion.

The LD circuitry 232 may be configured to detect and process the signals received from the laser detector 224 to achieve free-space optical communication. In an implementation, the LD circuitry 232 may employ laser detector electronics known in the art. The sub-components of the LD circuitry 232 are not shown for the sake of brevity. For example, the LD circuitry 232 may include the TIA, the limiting amplifier, and the CDR component for detecting and processing the signals received from the laser detector 224. In an implementation, for example, the TIA may be used convert a current signal generated by the laser detector 224 into a voltage signal. The TIA may amplify the current signal by converting it into a voltage signal. The TIA may be a part of front-end amplifier that may be employed to boost the signal to a level that can be detected by the limiting amplifier. The limiting amplifier may then be used to amplify the voltage signal produced by the TIA and to remove any noise or distortion in the signal. The limiting amplifier may have a threshold that sets the upper and lower limits of the input signal. When the input signal is below the lower threshold, the limiting amplifier output is zero, and when the input signal is above the upper threshold, the limiting amplifier output is at its maximum level. The limiting amplifier may be employed to ensure that the signal is clean and that it is not distorted by any noise. The CDR component may be used to recover the clock signal and the data signal from the incoming signal. The clock signal may be used to synchronize the laser detector 224 with the laser transmitter from where a laser beam with the first data signal is received receiver. In other words, to synchronize the receiver with the transmitter, while the data signal carries the actual information. The CDR component may be employed to ensure that the receiver (e.g., the laser detector 224) is synchronized with the transmitter (e.g., (e.g., the laser transmitter 420 of the service communication device 106A) and that the data is correctly decoded.

The OWPT component 236, under the control of the cloud server 116 in one example, may be configured to direct a beacon laser beam via the optical interface 228C over-the-air for an optical wireless power transmission to remotely charge the rechargeable battery 314 (FIGS. 3A and 3C) of the optical routing device 104A and further other the optical routing devices of the plurality of optical routing devices 104. For example, when the beacon laser beam strikes one of the plurality of optical routing devices 104, the beacon laser beam may be deflected further to other optical routing devices causing each rechargeable battery of each of the plurality of optical routing devices 104 to be charged wirelessly. In an implementation, the OWPT component 236 may be further configured to remotely charge the rechargeable battery 440 (FIG. 4) of the service communication device 106A and/or other service communication devices. In an implementation, the OWPT component 236 may be operably connected to the LT circuitry 230 and may have its own laser diode distinct from the laser transmitter 222 to function concurrently when in operation. In another implementation, the OWPT component 236 may be a transceiver (e.g., metal halide perovskite transceiver) that may be employed for both absorbing light from and emitting light (i.e., the third laser beam) to other OWPT systems equipped with similar transceivers, and an additional laser diode may not be required. The OWPT component 236 may be further configured to transmit the beacon laser beam in a wavelength to match a spectral response of the laser energy harvesting cell 316A of the optical routing device 104A. The beacon laser beam may be emitted in a defined power density to generate enough electricity (e.g., in milliwatts or even watts) to charge the rechargeable battery of other optical nodes, such as each of the plurality of optical routing devices 104 or the service communication device 106A. In an example, the beacon laser beam may be in a visible-light frequency spectrum, such as a red beacon laser beam (e.g., in about 400-700 nm wavelength range or at 800 nm wavelength in an exemplary implementation) that may be directed at a laser energy harvesting cell (e.g., a photovoltaic cell) or a region of the optical routing device 104A which then converts the light energy into electrical energy. The amount of power that can be transmitted depends on the intensity and wavelength of the light which can be controlled by the laser handling system 220 of the master communication device 102. In some cases, dye-sensitized solar cell (DSSC), plasmonic DDSC, or another type of laser energy harvesting cell (e.g., that employs special nanoparticle-embedded energy harvesting cells like perovskite solar cells (PSCs), upconverting nanoparticles (UCNPs) or Infrared-to-visible photon up-conversion systems) may be employed that can generate electricity not only from visible but also infrared or ultraviolet light spectrum. The master communication device 102 may receive power from an external power source, for example, AC or DC power source, whereas the plurality of optical routing devices 104 have in-built energy storage device, such as a rechargeable battery to power its operations. In some cases, each or some of one or more service communication devices 106 may further have a rechargeable battery like the plurality of optical routing devices 104 to power its operations when an external power source is challenging to connect to, during deployment.

Figure 3A:
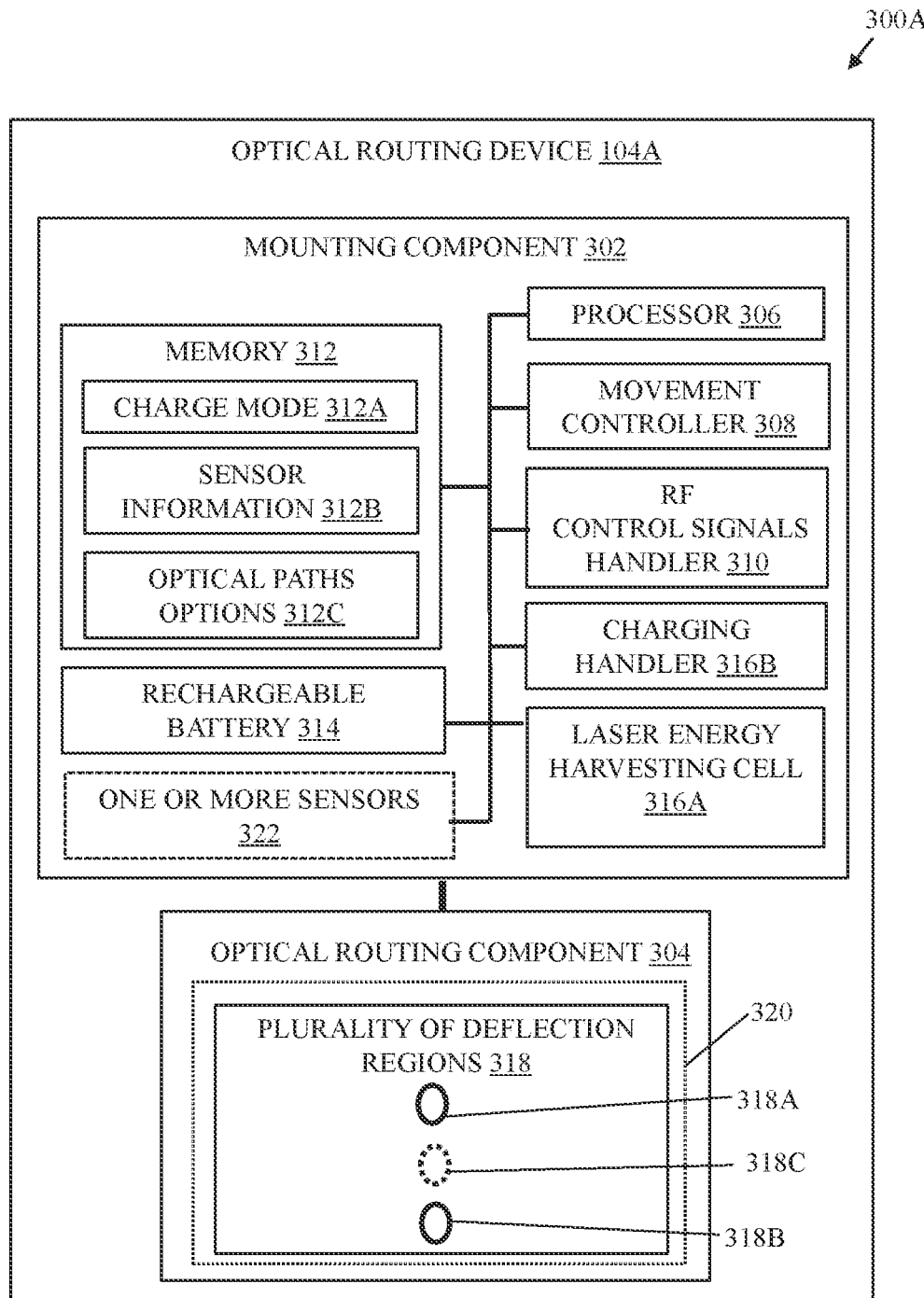
FIG. 3A is a block diagram that illustrates various components of an optical routing device of a communication system, in accordance with an exemplary embodiment of the disclosure.

FIG. 3A is a block diagram illustrating various components of an exemplary optical routing device of a communication system, in accordance with an exemplary embodiment of the disclosure. FIG. 3A is explained in conjunction with elements from FIG. 1 and FIG. 2. With reference to FIG. 3A, there is shown a block diagram 300A of the optical routing device 104A. The optical routing device 104A may be similar to that of other optical routing devices, such as the plurality of optical routing devices 104. Each of the plurality of optical routing devices 104 may be a light weight and a low power optical node with a small form factor. In an example, the dimensions of each of the plurality of optical routing devices 104 may range from 2 cm to 30 cm (width or length). In certain scenarios, the length may be extended using a length extender to maintain an alignment to send or receive a laser beam.

The optical routing device 104A may include a mounting component 302 and an optical routing component 304 attached to the mounting component 302. The mounting component 302 may be made of a variety of materials, including metal, mirror, or plastic, and may be sturdy and precise in order to accurately position the optical routing component 304. The mounting component 302 may hold the optical routing component 304 and allows it to be positioned and oriented in one or more angles to deflect one or more laser beams in one or more specific directions and angles. In some cases, the optical routing component 304 may further include a free-space optical beam splitter (shown in FIG. 3C in an example) or a free-space optical beam combiner (shown in FIG. 3C in an example) depending on the application scenario. The mounting component 302 may be mounted on a ceiling surface or a wall surface of the defined indoor area 112. In an example, mounting component 302 may be an electromechanical turret (also referred to as "eyeball"), or other mounting structure that is movable in 360 degrees around an axis (e.g., Y axis, and at least 30 degrees up and down with respect to an imaginary reference surface, running parallel to a ceiling surface in the defined indoor area 112). In another example, a small stepper motor driven mechanism may be used in the mounting component 302 to pan and tilt the optical routing device 104A.

The mounting component 302 may comprise a rechargeable battery 314 to power operations of the optical routing device 104A. Beneficially, the optical routing device 104A is developed to operate without the use of any external power supply from a power source (e.g., an alternating current power source), which in turn facilitates easy deployment of the optical routing device 104A. Moreover, the way the rechargeable battery 314 is intelligently charged using the same laser beam that is employed to carry a data signal in the laser beam based wireless communication network (i.e., the second communication network 120). This ensures flexibility in deployment as well as increases the reliability in operations of the optical routing device 104A. The optical routing device 104A may further include a laser energy harvesting cell 316A and a charging handler 316B.

The mounting component 302 may further comprise the processor 306 configured to communicate over-the-air with the master communication device 102 or one or more service communication devices 106 via one or more radio frequency (RF) supervisory links. In an example, the processor 306 may be implemented as low-power control circuit, which may be powered ON only when needed to save power. Other examples of the processor 306, may include but are not limited to a control circuitry, a microcontroller, a microprocessor, a state machine, a hardware processor, and or other control circuits. The processor 306 may be configured to communicate with the master communication device 102 or one or more service communication devices 106 by use of the RF control signal handler 310. For example, in an implementation, the RF control signal handler 310 may be configured to communicate control signals under the control of the processor 306 over existing Wi-Fi® signals in 2.4 GHz or 5-7 GHz frequency with the master communication device 102 to receive instructions in real time or near real time to change an angle or a direction of deflection of a laser beam in order to switch and align the laser beam to a different destination, such as a new optical routing device from among the plurality of optical routing devices 104. In another implementation, the plurality of optical routing devices 104 may be controlled and networked via a built-in BLUETOOTH™ link. In other words, RF supervisory links may be Bluetooth links or Wi-Fi® links.

The processor 306 may be further configured to receive an instruction via the one or more RF supervisory links by the cloud server 116 or the master communication device 102 to control a movement of the mounting component 302 along with the optical routing component 304 such that an angle or a direction of deflection of one or more laser beams from the optical routing component 304 is changed. In an example, the processor 306 may be configured to direct the movement controller 308 to move the mounting component 302 along with the optical routing component 304. The movement controller 308 enables the optical routing component 304 to be positioned and oriented in one or more angles to reflect a laser beam in one or more specific directions and angles. In an example, the movement controller 308 may include a servo motor, a stepper motor, or an actuator.

The optical routing component 304 may comprise one or more laser beam handling regions 318 configured to handle a plurality of laser beams concurrently in which a first laser beam is deflected via a laser beam handling region 318A of the one or more laser beam handling regions 318 for downstream data communication in a downstream path and a second laser beam is deflected via a second laser beam handling region 818B of the one or more laser beam handling regions 318 for upstream data communication in an upstream path. In an example, the one or more laser beam handling regions 318 may be two distinct laser beam handling interfaces provided on the laser beam handling surface 320 configured to deflect two laser beams concurrently, where one laser beam may be directed towards the downstream path and the other laser beam may be directed towards the upstream path. In accordance with an embodiment, the downstream path corresponds to communication from the master communication device towards the one or more service communication devices via at least the optical routing device 104A. The upstream path corresponds to communication from one or more end-user devices 108A and 108B to the one or more service communication devices and further to the master communication device via at least the optical routing device 104A. Each of the one or more laser beam handling regions 318 may comprise a mirror or a mirror-like surface to deflect a corresponding laser beam. Each of the one or more laser beam handling regions 318 may include a mirror or a mirror-like surface to deflect one laser beam. For example, the mirror-like surface may be made from a variety of materials and coatings, such as aluminum, or silver, and polished and coated in order to achieve the highest possible reflectivity.

In accordance with an embodiment, the first laser beam may carry a first data signal from the master communication device 102. The second laser beam may carry one or more second data signals from the one or more service communication devices 106. The one or more second data signals correspond to user data associated with a plurality of end-user devices 108. In an example, when the laser beam strikes the laser beam handling region, such as the laser beam handling region 318B, the laser energy harvesting cell 316A in the charging handler 316 may absorbs the light energy and converts it into electrical energy, which is then stored in the rechargeable battery 314.

In an implementation, the mounting component 302 may include a memory 312. The memory may be configured to store instructions related to activation or deactivation of the charge mode 312A. The memory 312 may further store sensor information 312B acquired from the one or more sensors 322 and optical path options 312C. The optical path options 312C may be different fall-back laser-link options available to a given optical routing device to establish a laser beam connectivity. The fall-back laser-link options for each optical routing device may include location coordinates of each optical routing device and corresponding two or more neighbouring optical routing devices and laser beam alignment information, such as an angle of deflection of a laser beam, a direction of deflection of the laser beam, a beam width of the laser beam, and a laser intensity to be set for the laser beam, between two optical routing devices. The fall-back laser-link options for each of the plurality of optical routing devices 104 may be used to generate the plurality of different laser-communication route options. There may be different optical path options 312C for upstream path and the downstream path. In an example, the optical path options 312C may be historical data of previous connections done by each of the plurality of optical routing devices 104 after installation to their corresponding locations in the defined indoor area 112. In another example, the optical path options 312C may be proactively determine options to establish laser beam-based connections by each of the plurality of optical routing devices 104. Alternatively, and additionally, the optical path options 312C may be acquired from the cloud server 116.

Figure 3B:
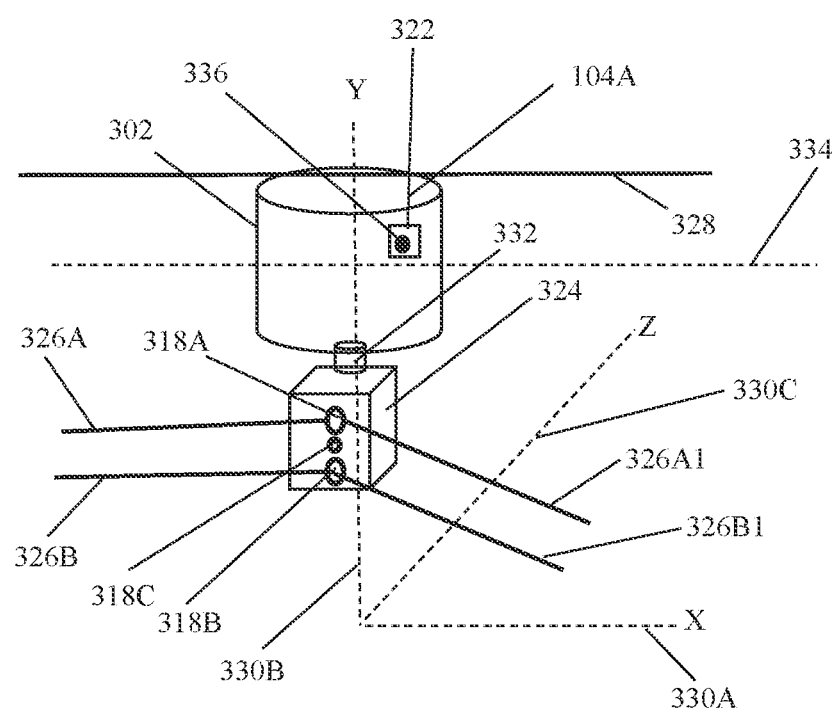
FIG. 3B is a diagram illustrating an exemplary optical routing device of a communication system, in accordance with another exemplary embodiment of the disclosure.

FIG. 3B is a diagram illustrating an exemplary optical routing device of a communication system, in accordance with an exemplary embodiment of the disclosure. FIG. 3B is explained in conjunction with elements from FIGS. 1, 2, and 3A. With reference to FIG. 3B, there is shown the optical routing device 104A.

In an implementation, the cloud server 116 may cause the master communication device 102 (FIG. 1) to transmit a first laser beam 326A for downstream communication and a second laser beam 326B for upstream communication. In an example, the movement of the mounting component 302 with respect to the optical routing component 304 may be achieved using a movable attachment element 332 that movably connects the mounting component 302 with the optical routing component 304. The movable attachment element 332 may be a ball shaped movable element, an oval shaped movable element, a pipe-shaped movable element or a combination thereof.

In accordance with an embodiment, the control of the movement of the mounting component 302 along with the optical routing component 304 may comprise controlling a pitch rotation of the mounting component 302 along an x-axis 330A that is parallel to a mounting surface 328 of the optical routing device 104A. The control of the movement may be in response to the instruction received from the master communication device 102 or the cloud server 116 via the one or more RF supervisory links. The mounting component 302 along with the optical routing component 304 may be rotated along the x-axis 330A. The control of the movement of the mounting component 302 along with the optical routing component 304 may further comprise controlling a yaw rotation of the mounting component 302 along a y-axis 330B orthogonal to the x-axis 330A. The control of the movement of the mounting component 302 along with the optical routing component 304 may further comprise causing an alignment of an optical path among the master communication device 102 one or more other optical routing devices, and the one or more service communication devices 106, based on the controlling of the pitch rotation or the yaw rotation of the mounting component 302.

In accordance with an embodiment, the control of the movement of the mounting component 302 along with the optical routing component 304 further comprises controlling a roll rotation of the mounting component 302 along a z-axis 330C and aligning a transmit polarization of the one or more laser beams deflected by the optical routing component 304 in accordance with a destination device when an optical polarization multiplexing is utilized in data communication over a laser beam-based wireless communication network. The optical polarization multiplexing is used to transmit multiple data streams over a single laser beam by encoding the data onto different polarization states of light. The transmit polarization of the one or more laser beams deflected by the optical routing component 304 may be aligned by adjusting the orientation of the optical routing component 304 so that it deflects light with a specific polarization state in the transmission path, for example, the upstream path or the downstream path. The polarization of laser emission refers to the direction of the electric field oscillation of a given laser beam. The destination device may be one of the master communication device 102, one or more other optical routing devices, or the one or more service communication devices 106.

In accordance with an embodiment, the mounting component 302 may further comprise one or more sensors 322 (such as an accelerometer, a gyroscope, a magnetometer, a geospatial positioning sensor, and the like) to measure an orientation and a level of the optical routing component 304 with respect to a reference surface 334 to maintain an alignment of an optical path with one or more of the master communication device 102, one or more other optical routing devices, and the one or more service communication devices 106. The one or more sensors 322 correspond to the one or more sensors 122 of FIG. 1. The reference surface 334 may be an imaginary reference surface running parallel to a ceiling surface, such as the mounting surface 328, in the defined indoor area 112. The level corresponds to a distance from the reference surface 334. The processor 306 may be further configured to communicate the measured orientation, the level, and location data of the optical routing device 104A over the one or more RF supervisory links to the master communication device 102 or the cloud server 116.

In accordance with an embodiment, the optical routing device 104A may further comprise a temperature sensor 336. The processor 306 may be further configured to determine a thermomechanical-induced change in an alignment of an optical path of the optical routing device 104A with one or more of the master communication device 102, one or more other optical routing devices, and the one or more service communication devices 106. The processor 306 may be further configured to execute an automatic alignment of the optical path when a temperature monitored by the temperature sensor 336 is outside a pre-set range.

In accordance with an embodiment, the processor 306 may be further configured to receive a Laser Beam Network Control (LBNC) instructions from the master communication device 102 or the cloud server 116. The processor 306 may be further configured to dynamically adjust an orientation of the one or more laser beam handling regions 318 in the laser beam handling surface 320 of the optical routing component 304, based on the LBNC instructions received from the master communication device 102 or the cloud server 116 via the one or more RF supervisory links. The processor 306 may be further configured to switch and re-align the one or more deflected laser beams 326A1 and 326B1 in a real-time or a near real-time to a different destination device based on a change in the angle or the direction of deflection of the one or more laser beams from the optical routing component 304. For example, the one or more deflected laser beams 326A1 and 326B1 may be deflected to a new optical routing device from among the plurality of optical routing devices 104 or a new service device of the one or more service communication devices 106. An example of the change in the laser beam-based communication route or switching from one optical routing device to another is shown and described, for example, in FIG. 6A.

Figure 3C:
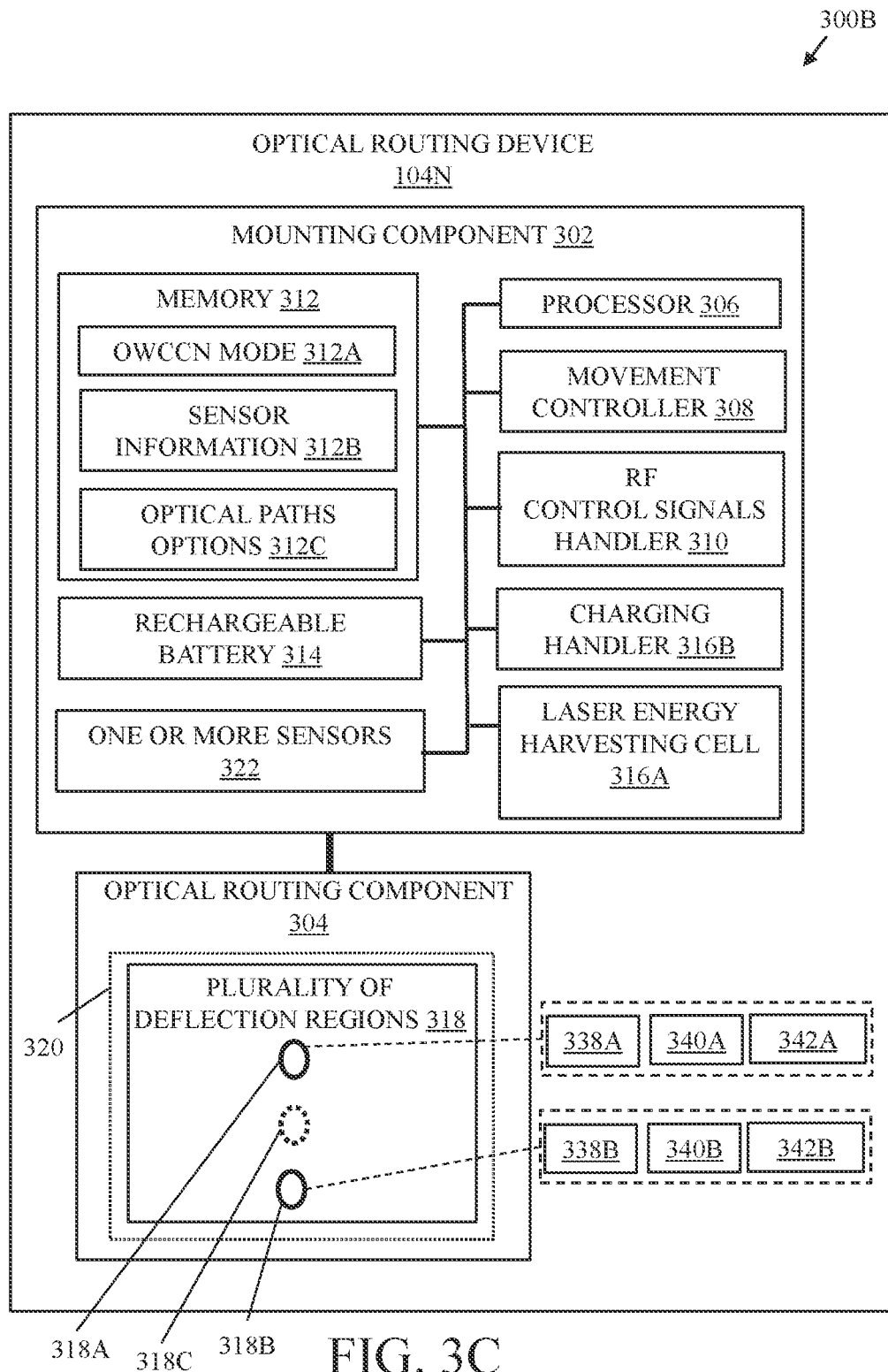
FIG. 3C is a block diagram illustrating various components of an exemplary optical routing device of a communication system, in accordance with yet another exemplary embodiment of the disclosure.

FIG. 3C is a block diagram illustrating various components of an exemplary optical routing device of a communication system, in accordance with another exemplary embodiment of the disclosure. FIG. 3C is explained in conjunction with elements from FIGS. 1, 2, 3A and 3B. With reference to FIG. 3C, there is shown a block diagram 300B of the optical routing device 104N. The optical routing device 104N may be similar to that of the optical routing device 104A except that the optical routing device 104N may further include one or more lens 338A and 338B, one or more beam-splitters 340A and 340B, and one or more polarizers 342A and 342B.

In this embodiment, the optical routing device 104N may further comprise one or more lens 338A and 338B mounted on one or more of one or more laser beam handling regions 318 to cause one or more of: a) focus a laser beam deflected to a destination device, b) collimate the laser beam deflected to the destination device, or c) change a shape of the laser beam deflected to the destination device. In some implementations, each of the one or more lens 338A and 338B may be used to focus or collimate the laser beam, or to change the size or shape of the beam. Each of the one or more lens 338A and 338B may be made of a variety of materials, including glass, plastic, and quartz. In an implementation, a filter may be used to block or absorb certain wavelengths of light, which can be used to fine-tune the characteristics of a laser beam.

In accordance with an embodiment, the optical routing component 304 may further comprise one or more beam-splitters 340A and 340B. Each beam-splitter may be configured to split a laser beam of the plurality of laser beams into two or more laser beams or combine multiple laser beams into a single beam. In an implementation, the one or more beam-splitters 340A and 340B may be fixedly mounted on one or more of the one or more laser beam handling regions 318 of the optical routing component 304. In another implementation, the one or more beam-splitters 340A and 340B may be movably mounted in the mounting component 302 independent of the one or more laser beam handling regions 318. The processor 306 may be configured to extend or retract the one or more beam-splitters 340A and 340B from the mounting component 302 based on the LBNC instructions received from the master communication device 102 or the cloud server 116.

In an exemplary implementation, at least one of the one or more beam-splitters 340A and 340B may be used in a case where the Laser Beam Mesh Network (LBMN) is generated, and one laser beam may be required to be formed into two or more separate laser beams. The one or more beam-splitters 340A and 340B may be free-space optical beam-splitters may or may not be used in laser beam cascaded network (LBCN) as cascaded deflection of one laser beam among multiple optical nodes, such as the plurality of optical routing devices 104, may be performed for downstream communication. Further, cascaded deflection of another laser beam for upstream communication may be sufficient to create the laser beam cascaded network (LBCN) using the one or more laser beam handling regions 318. In an implementation, at least one beam-splitter may be mounted at the location of one of the one or more laser beam handling regions 318, such as the laser beam handling region 318A. Alternatively, at least one beam-splitter may be mounted at the optical routing component 304 at a specific position to maintain an alignment of an optical route for downstream path or an upstream path or both to perform free-space optical communication. Examples of the one or more beam-splitters 340A and 340B may include but are not limited to a cube beam-splitter (having two prisms joined together as a cube), a plate beam-splitter, a Dichroic mirror, a half-silvered mirror, a polarizing beam-splitter, or a micro-mirror cut in a specific shape such that when an laser beam strikes on the micro-mirror, the laser light splits in a defined ratio into two separate laser beams, or an arrangement of one or more specific shaped mirrors or prisms. In yet another example, one of the one or more laser beam handling regions 318, such as the laser beam handling region 318A, may be filled with an optically active liquid (e.g., a chiral liquid) that has the ability to split a light beam, such as a laser beam into two separate laser beams. In yet another example, one of the one or more laser beam handling regions 318, such as the laser beam handling region 318A may be made of crystal-like substance, such as calcite or quartz that may be cut in a specific shape to split a light beam, such as a laser beam into two or more separate laser beams. Moreover, the one or more beam-splitters 340A and 340B may be used in reverse to combine two different beams into a single one or a dedicated free-space optical beam combiner may be used. In an implementation, one of the one or more laser beam handling regions 318, such as the laser beam handling region 318B, to combine two different beams into a single beam for upstream communication towards the master communication device 102. In an example, the laser beam handling region 318C may be used to receive a third laser beam (e.g., beacon laser beam in a visible light spectrum, for example at around 800 nm) for an optical beam alignment and for the optical wireless charging of the rechargeable battery 314.

In accordance with an embodiment, the optical routing component 304 may further comprise one or more polarizers 342A and 342B. The processor 306 under the control of the cloud server 116 may be further configured to control a polarization of the plurality of laser beams, such as the first laser beam 326A and the second laser beam 326B, via the one or more polarizers 342A and 342B. In an implementation, the one or more polarizers 342A and 342B may be used to control the polarization of the laser beam, which can be used to filter out unwanted reflections or to modify the properties of the laser beam, for example, to accommodate more data, using multiple polarizations. The one or more polarizers 342A and 342B may be a free-space optical beam polarizers. Polarized laser beams are light waves in which the vibrations occur in a single plane and the process of transforming unpolarized light into polarized light is known as polarization. Beneficially, each of the plurality of optical routing devices 104 may have one or two distinct laser beam handling regions, such as the laser beam handling regions 318A and 318B, to handle a pair of laser beams concurrently in which the first laser beam 326A may be used for downstream data communication in the downstream path and the second laser beam 326B may be used for upstream communication in the upstream path.

In an implementation, the optical routing device 104A may be a passive optical node, where there is no amplification of signals in the deflected one or more laser beams. Alternatively, in another implementation, the optical routing device 104A may be an active optical node, where optical amplification may be employed to boost the signal in order to overcome for power loss. For example, in the 1550 nm wavelength band, Erbium Doped Fiber Amplifiers (EDFA) may be used and for the 1300 nm wavelength band, Semiconductor Optical Amplifiers (SOA) may be employed.

The optical routing device 104A may further include the laser energy harvesting cell 316A and the charging handler 316B. Examples of the laser energy harvesting cell 316A may include, but is not limited to a photovoltaic cell that may handle visible light spectrum (400-800 nm wavelength), a dye-sensitized solar cell (DSSC), a plasmonic DDSC, or another type of laser energy harvesting cell that employs special nanoparticle-embedded energy harvesting cells like perovskite solar cells (PSCs), upconverting nanoparticles (UCNPs) or Infrared-to-visible photon up-conversion systems may be employed that can generate electricity not only from visible but also infrared or ultraviolet light spectrum. Typically, silicon-based photovoltaic cells are most efficient at converting light in the visible and near-infrared spectrum, while other materials, such as nanoparticle-embedded energy harvesting cells, PSCs, UCNPs based photovoltaic cells may be more efficient at converting light in other wavelengths of the spectrum. The generated power than may be stored in an energy storage device, such as the rechargeable battery 314. The charging handler 316 may be the optical wireless charging handler that may be configured to manage the power generated by the laser energy harvesting cell 316A and may have safety mechanism to cut OFF an electrical connection between the laser energy harvesting cell 316A and the rechargeable battery 314 to prevent over-charging and ensure a safe charging process. In such a case, the laser energy harvesting cell 316A may be positioned at the laser beam handling region 318C to harvest the third laser beam (i.e., the power laser or the beacon laser beam) from the master communication device 102. When the third laser beam strikes the laser beam handling region, such as the laser beam handling region 318C, the laser energy harvesting cell 316A may absorbs the light energy and converts it into electrical energy, which is then stored in the rechargeable battery 314.

Figure 4:
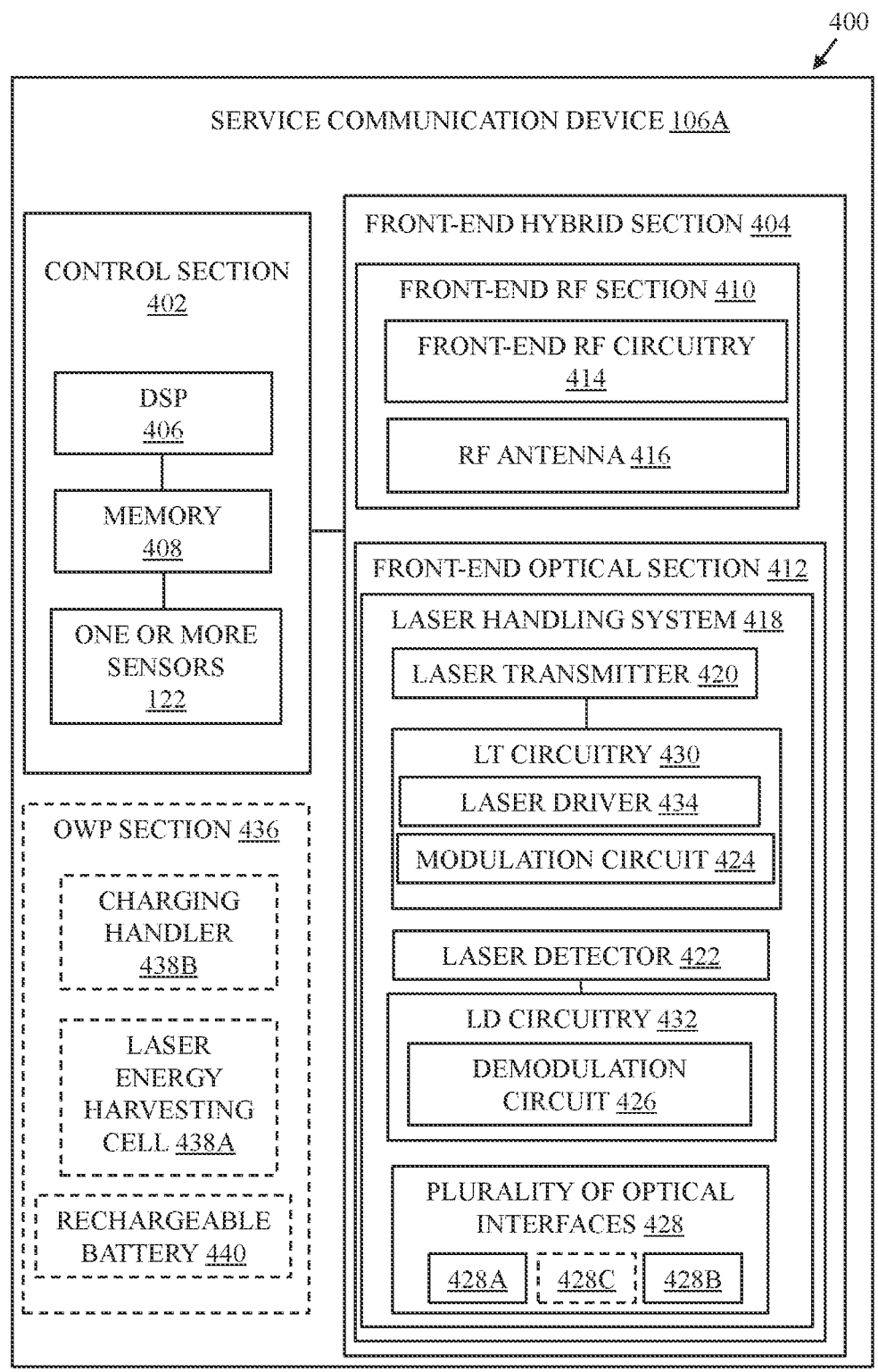
FIG. 4 is a block diagram that illustrates various components of an exemplary service communication device of a communication system, in accordance with an exemplary embodiment of the disclosure.

FIG. 4 is a block diagram illustrating various components of an exemplary service communication device of a communication system, in accordance with an exemplary embodiment of the disclosure. FIG. 4 is explained in conjunction with elements from FIGS. 1, 2, and 3. With reference to FIG. 4, there is shown a block diagram 400 of the service communication device 106A. The service communication device 106A may include a control section 402 and a front-end hybrid section 404. The control section 402 may include a DSP 406, a memory 408, and the one or more sensor 122 (of FIG. 1). The control section 402 may be communicatively coupled to the front-end hybrid section 404. The front-end hybrid section 404 may include a front-end RF section 410 and a front-end optical section 412. The front-end RF section 410 may include front-end RF circuitry 414 and a RF antenna 416. The front-end optical section 412 may include a laser handling system 418, which includes a laser transmitter 420, a laser detector 422, a modulation circuit 424, a demodulation circuit 426, and a plurality of optical interfaces 428. In an implementation, the laser handling system 418 may further include a laser transmission (LT) circuitry 430 and a laser detector (LD) circuitry 432. The LT circuitry 430 may include free-space laser transmitter electronics, such as a laser driver 434, the modulation circuit 424, and in some exemplary implementations, additionally one or more beam-shaping optics (not shown) similar to the master communication device 102. The LD circuitry 432 may include free-space laser detector electronics, such as the TIA for converting the current signal from the laser detector 422 to a voltage signal, a limiting amplifier for amplifying and cleaning the signal, and a Clock and Data Recovery (CDR) component for recovering clock and data signals from the incoming signal similar to that of the master communication device 102. The different components of the service communication device 106A maybe similar to that of the master communication device 102 expect that the service communication device 106A may not include a backhaul connection component, such as the backhaul connection component 214 of FIG. 2, and further the demodulation circuit 426 may be a dual-function circuit that not only demodulates the data signal from the first laser beam but also performs mapping of the extracted data to a RF wave to be emitted by the RF antenna 416 to the plurality of end-user devices 108 and further extracts data received from the plurality of end-user devices 108 via one or more RF waves in upstream path and passes to the modulation circuit 424.

Beneficially, the plurality of optical interfaces 428 are special purpose physical interfaces to handle a plurality of laser beams concurrently segregating download and upload functions via a plurality of distinct laser beams. An optical interface, such as an optical interface 428A, may be coupled to the laser detector 422 to receive a focused narrow beam over the air, for example, from one of the plurality of optical routing devices 104. Another optical interface, such as an optical interface 428B, may be coupled to the laser transmitter 420 to focus the second laser beam in a defined beam width, such as into a narrow, collimated beam, for example, to the one of the plurality of optical routing devices 104. Further, another optical interface, such as an optical interface 428C, may be coupled to the laser energy harvesting cell 438A connected to the rechargeable battery 440 to charge the rechargeable battery 440 of the service communication device 106A. The optical interface 428C may also be used for optical beam alignment. Similar to that of the optical routing device 104A, the service communication device 106A may further include the charging handler 438B. In other words, in some implementation, the service communication device 106A may include the OWP section 436 that may include the laser energy harvesting cell 438A, the charging handler 438B, and the rechargeable battery 440 like the optical routing device 104A. In some implementations, the laser energy harvesting cell 438A may be a transceiver (e.g., metal halide perovskite transceiver) that may be employed for both absorbing light from and emitting light to other OWPT systems equipped with similar transceivers, and an additional laser diode may not be required.

Figure 5:
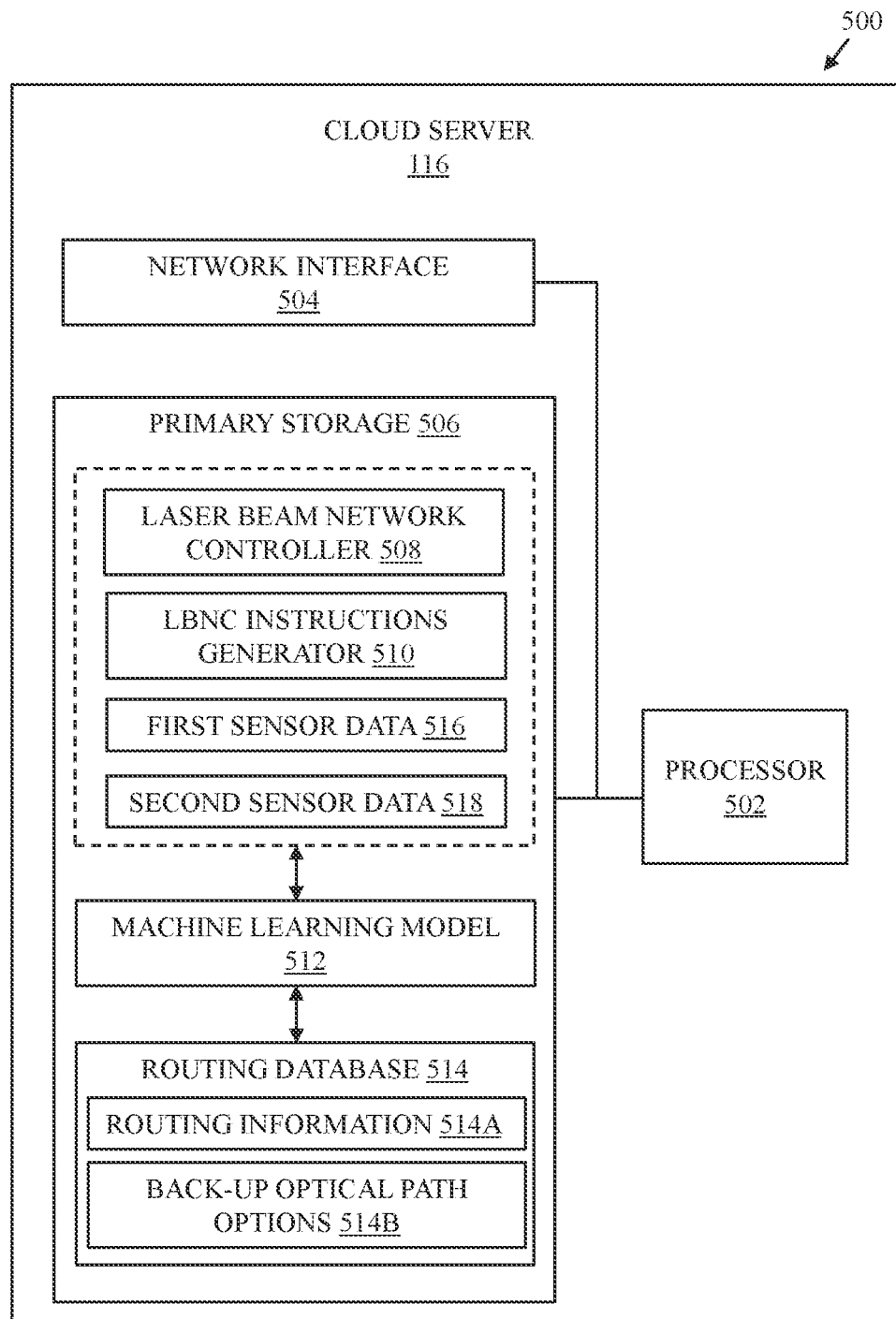
FIG. 5 is a block diagram that illustrates various components of an exemplary cloud server of a communication system, in accordance with an exemplary embodiment of the disclosure.

FIG. 5 is a block diagram illustrating different components of an exemplary cloud server, in accordance with an embodiment of the disclosure. FIG. 5 is explained in conjunction with elements from FIGS. 1, 2, 3A to 3C, and 4. With reference to FIG. 5, there is shown a block diagram 500 of the cloud server 116. The cloud server 116 may include a processor 502, a network interface 504, and a primary storage 506. The primary storage 506 may further include a laser beam network controller 508 and a Laser Beam Network Control (LBNC) instructions generator 510. There is further shown a machine learning model 512 and a routing database 514, which may include routing information 514A and back-up optical path options 514B. In an implementation, the primary storage 506 may further store the first sensor data 516 and second sensor data 518 for processing.

In operation, the processor 502 may be configured to obtain the first sensor data 516 associated with the defined indoor area 112. The first sensor data 516 refers to sensor data that are used to visually perceive the defined indoor area 112, such as an apartment in a building, or an enterprise interior space. The first sensor data 516 may include information of the physical environment, including the layout, structure, and features of the interior space of the defined indoor area 112. This information is then processed and used to create a visual representation of the defined indoor area 112. The first sensor data 516 may define the physical attributes of the defined indoor area 112, such as a size, shape, a 3D layout, as well as any signal attenuating objects, such as walls, furniture, or other features within the defined indoor area 112. In an implementation, the first sensor data 516 may be obtained from the master communication device 102. In another implementation, the first sensor data 516 may be obtained from each of the plurality of optical nodes 124 or some of the plurality of optical nodes 124.

In accordance with an embodiment, the first sensor data 516 may comprise one or more of a three-dimensional (3D) map of the defined indoor area 112, a two-dimensional (2D) or a 3D layout plan of the defined indoor area 112, a point cloud of physical structures, such as walls, floors, ceilings, rooms layout, hallway, etc, in the defined indoor area 112, one or more images of the defined indoor area 112, a video of the defined indoor area 112, or other visual data of the defined indoor area 112.

In accordance with an embodiment, due to the line-of-sight (LOS) nature of laser beam transmission, misalignment of a laser transmitter and a laser receiver, known as a pointing error, may reduce data transmission fidelity or hinder such transmissions. In one aspect of the present disclosure, the installation of each optical node (i.e., each of the plurality of optical routing devices 104, the master communication device 102, and each of the one or more service communication devices 106) may be performed with proper alignment in a manner that is easy, robust, and can be done even by a non-technical person. The first step may be proper mounting of all the optical nodes (i.e., each of the plurality of optical routing devices 104, the master communication device 102, and each of the one or more service communication devices 106) on a hard surface such as a wall, ceiling, or pole. To this end, laser-level tools, may be used to project horizontal and vertical visible laser lines on such hard surfaces to guide the positioning of the optical nodes to ensure a rough or coarse initial alignment. The processor 502 may be configured to determine a plurality of different mounting points in the defined indoor area 112 where the plurality of optical routing devices 104 may be placed or mounted. In an implementation, a laser leveller (e.g., a laser levelling device 702 of FIG. 7A) may be used to guide installation points of the plurality of optical routing devices 104. An example is shown and described, for example, in FIG. 7A. The image or video of the defined indoor area 112 with such projected laser guides may be acquired by the cloud server 116. Such visual data item may be captured from the application installed in the smartphone held by a user, from any image-capture device, such as the image-capture device 110. Such visual data item may be pre-captured or captured in real time and acquired by the master communication device 102 and further communicated to the cloud server 116. Based on the first sensor data 516, such as the visual data item, such as the image, the video, or the three-dimensional (3D) map of the defined indoor area 112, the processor 502 (or the master communication device 102) may be configured to process the visual data item to determine the plurality of different points in the defined indoor area 112 where the plurality of optical routing devices 104 may be placed. Such placement forms a cascaded or a mesh network of the plurality of optical routing devices 104 to cause the master communication device 102 to reach to the one or more service communication devices 106 assisted by the cloud server 116. In another example, one or more 3D mapping cameras and digital twin technology can optionally be used to plan the location of the optical nodes, by creating an immersive 3D model of the operating environment. In yet another example, the plurality of optical routing devices 104 may be manually placed at the plurality of different locations in the defined indoor area 112 without assistance from the cloud server 116 or the master communication device 102.

In accordance with an embodiment, in order to indicate different installation positions of the plurality of optical routing devices 104, the processor 502 may be further configured to cause the master communication device 102 to direct a pencil laser beam in a visible light spectrum to the optical routing device 104A in the defined indoor area 112. For example, the master communication device 102 may direct the pencil laser beam in the visible light spectrum pointing towards a point in a wall near the ceiling or a point in the ceiling in the defined indoor area 112, where both points are in a line-of-sight of the master communication device 102. After the optical routing device 104A is installed at the selected point, the processor 502 may cause the master communication device 102 to control a movement of the optical routing device 104A and direct the pencil laser beam in the visible light spectrum towards the optical routing device 104A, which further deflects the pencil laser beam to a plurality of points in the defined indoor area 112. Based on at least where the service communication device, such as the service communication device 106A, is to be placed, one point from the plurality of points is selected to install the optical routing device 104B of the plurality of optical routing devices 104 (e.g., the optical routing devices 104A, 104B, 104C, . . . , 104N). Similarly, the third, fourth, and other optical routing devices may be installed with assistance by the cloud server 116 or the master communication device 102.

In an implementation, after mounting of the plurality of optical nodes 124, the processor 502 may be further configured to perform a first alignment between one or more pairs of optical nodes of the plurality of optical nodes 124. The first alignment may be coarse alignment. In an example, the coarse alignment may be executed using measurements of the Earth's magnetic field (e.g., an electronic compass) to work out the orientation (i.e., the heading) and the gravitational field to sense the tilt (i.e., the level) of the optical nodes including the laser transmitter, and the laser receiver. Each optical node (i.e., each of the plurality of optical routing devices 104, the master communication device 102, and each of the one or more service communication devices 106), may include one or more sensors 122, such as magnetic and gravity field sensors or electronic compass, which may be used to measure the direction of the Magnetic North and a downward direction towards earth surface at the location of the one or more sensors 122. For example, a first optical node may communicate its heading using RF supervisory link to a second optical node so that the second optical node may also change its heading to align with the first optical node.

In an implementation, the one or more sensors 122 may include three magnetic field sensors, which may be provided at each optical node (i.e., each of the plurality of optical routing devices 104, the master communication device 102, and the one or more service communication devices 106). The three magnetic field sensors may be positioned perpendicular to each other, which may be used to find a local direction of the earth's Magnetic North. The magnetic field sensors may employ an optional declination correction to relate the magnetic north to the true north. Further, the one or more sensors 122 may include three accelerometers, which may sense gravity to provide tilt information (i.e., to evaluate which way is downwards). Using the orientation and the tilt (i.e., level) data, a motorized altazimuth (i.e., one of the one or more sensors 122) may be used that may automatically point and align two optical nodes together to establish a wireless laser beam communication. In an example, the one or more sensors 122 may further include a Micro Electronic Mechanical Systems (MEMS) motion sensor, which may have a 3-axis accelerometer as well as a 3-axis gyroscope, may be used.

In another implementation, in order to achieve leveling, a gimbal similar to that used in ships, to maintain horizontal levels for compasses, stoves, lights etc., may be employed. In yet another implementation, the one or more sensors 122 may include a miniature pendulum, which may be used to maintain a precise horizontal level with respect to the downward force on the pendulum. The plurality of the orientation, level and location data may be communicated to the master communication device 102 or the cloud server 116 (i.e., a network management software), for visualization, troubleshooting, optimization, and monitoring of the laser beam based wireless network, such as the second communication network 120.

The processor 502 may be further configured to obtain the second sensor data 518 associated with each of the plurality of optical nodes 124 in the defined indoor area 112. In an implementation, the second sensor data 518 may be a non-visual sensor data. In another implementation, the second sensor data 518 may be a combination of the non-visual and visual sensor data. The second sensor data 518 may complement the first sensor data 516 by providing a more detailed and accurate representation of the defined indoor area 112. By combining these two types of sensor data, the processor 502 may create a comprehensive and accurate picture of the defined indoor area 112. For example, a precise location and physical dimensions of signal obstructing objects or signal attenuating objects that may obstruct an optical path as well as RF paths may be ascertained by the first sensor data 516 and the second sensor data 518. Furthermore, the second sensor data 518 may be used to monitor performance and health of the plurality of optical nodes 124 including the one or more sensors 122 within the defined indoor area 112. For example, by monitoring the temperature surrounding each optical node of the plurality of optical nodes 124, any overheating issues at each optical node may be proactively managed and sorted ensuring that each optical node remain operational with optimum performance.

In accordance with an embodiment, the second sensor data 518 may comprise one or more of a unique identifier of each optical node of the plurality of optical nodes 124, a direction of pointing of a laser transmitter of each optical node, a direction of pointing of a laser detector of each optical node, an angle of projection or deflection of a laser beam with respect to a reference surface at each optical node, a three-dimensional (3D) position coordinate of each optical node, a measured temperature surrounding each optical node, a roll rotation value along the z-axis 330C of each optical routing device of the plurality of optical routing devices 104, a pitch rotation value along the x-axis 330A that is parallel to a mounting surface 328 of each optical routing device, a yaw rotation value of each optical routing device along the y-axis 330B orthogonal to the x-axis 330A, and location information of one or more end-user devices 108A and 108B in the defined indoor area 112.

The processor 502 may be further configured to obtain location coordinates of each of the plurality of optical nodes 124 in the defined indoor area 112. The plurality of optical nodes 124 may comprise the master communication device 102, the plurality of optical routing devices 104, and one or more service communication devices 106. In an implementation, the location coordinates of each of the plurality of optical nodes 124 may be obtained collectively from the master communication device 102. In another implementation, the location coordinates of each of the plurality of optical nodes 124 may be obtained individually from each of the plurality of optical nodes 124. The master communication device 102 may be configured to process the geospatial positioning data from each of the plurality of optical nodes 124 and augment such geospatial positioning data, using one or more secondary data to determine accurate location coordinates of each of the plurality of optical nodes 124 in the defined indoor area 112. For example, the processor 502 may cause the master communication device 102 to use Wi-Fi® triangulation to determine each optical node's precise indoor location by measuring RF signal strength at each optical node. Alternatively, a combination of geospatial positioning data, Wi-Fi®, Bluetooth Low Energy (BLE) beacons, and indoor maps, may be used to calibrate and find accurate location coordinates of each of the plurality of optical nodes 124. In another example, the one or more sensors 122 may be provided at each of the plurality of optical nodes 124. In such a case, for example, the sensor output from certain sensors, such as magnetometer and accelerometer sensors, may be correlated and combined to obtain an accurate two-dimensional (2D) or three-dimensional (3D) location of each of the plurality of optical nodes 124.

In accordance with an embodiment, after the first alignment (i.e., the coarse alignment), the processor 502 may be configured to perform a second alignment between one or more pairs of optical nodes of the plurality of optical nodes 124. The second alignment may be a fine alignment executed at each optical node. Based on the orientation and tilt sensor data, the master communication device 102 or the cloud server 116 may be further configured to perform the fine alignment at each optical node to align a laser beam transmission path at each optical node. The fine alignment may be performed by use of one or more beacon lasers (e.g., a pencil laser beam in the visible light spectrum), one or more image-capture devices, such as the image-capture device 110, and a motorized altazimuth. In an example, the processor 502 may be further configured to cause the master communication device 102 to direct a pencil laser beam in a visible light spectrum to the optical routing device 104A in the defined indoor area 112 to align an optical path. The optical routing device 104A may then deflect the pencil laser beam to other optical routing devices 104B, 104C, . . . , 104N, in the defined indoor area 112, to make them optically aligned to the laser beam transmission path. Similarly, each service communication device may be aligned accordingly. The optical alignment may be controlled by the master communication device 102 or the cloud server 116. At each optical node, transmitted laser power may be monitored as well as the optical RSSI. If laser power has not degraded but the optical receiver RSSI indicates a drop in power, then an automatic optical alignment routine may be executed. The optical RSSI and transmit laser power may be monitored and reported back to the master communication device 102 or the cloud server 116 (hosting network management software) via a radio frequency (RF) wireless connectivity. Additionally, visible color LED's may be provided on each optical node to indicate a connection status. For example, when a laser beam link is operating properly, the LED may be green at such particular node. When power is below a defined level, the indicator may turn orange and when the laser link is interrupted, it may turn red. Further, when the communication system 100 may be executing an alignment procedure, the LED indicator may keep flashing.

In an implementation, the one or more sensors 122 at each optical node may also be equipped with a geospatial sensor (e.g., a GPS sensor) for the localization of the optical nodes. For identifying the locations of the optical nodes in GPS-denied environments, when GPS accuracy is insufficient, and for optimization of the laser beam, optical nodes may perform range measurement. The range measurements may provide the distance between two optical nodes (i.e., specifically, the laser receiver and laser transmitter) independent of the GPS sensor. The range measurements may be done by pulsing the beacon laser (an additional laser beam or power laser) in the visible light spectrum or modulating the beacon laser with an alternating current (AC) signal and using time of flight measurements at the laser receiver using a common clock. The range measurement in combination with tunable lenses (in which focal length may be adjusted mechanically or electrically) may permit fine adjustments to the beam divergence for optimum data signal transmission across the laser beam based wireless network, such as the second communication network 120.

The processor 502 may be further configured to cause at least the master communication device 102 to form a laser beam-based wireless communication network (i.e., the second communication network 120) in the defined indoor area 112 based on the obtained location coordinates of each of the plurality of optical nodes 124, the obtained first sensor data 516, and the obtained second sensor data 518. In accordance with an embodiment, the laser beam-based wireless communication network may be one of a Laser Beam Mesh Network (LBMN) or a Laser Beam Cascaded Network (LBCN). An example of the Laser Beam Cascaded Network (LBCN) is shown and described, for example, in FIG. 6A. An example of the Laser Beam Mesh Network (LBMN) is shown and described, for example, in FIG. 6B. The processor 502 may be further configured to cause at least the master communication device 102 to generate the LBMN or the LBCN using the plurality of optical routing devices 104 disposed at the plurality of locations in the defined indoor area 112 to wirelessly connect to one or more service communication devices 106 in the defined indoor area 112.

In order to form the laser beam-based wireless communication network (i.e., the second communication network 120) in the defined indoor area 112, the processor 502 may first generate the routing database 514 that may include the routing information 514A as well as the back-up optical path options (BOPO) 514B based on the location coordinates of each of the plurality of optical nodes 124, the obtained first sensor data 516, and the obtained second sensor data 518. In an example, the routing information 514A may be a routing table, which may be part of the routing database 514. An exemplary the routing database 514 is shown, for example, in the form of a table, such as TABLE 1, below.

TABLE 1

| ON_ID | NT | LC | DFC (in mm) | DFF (in mm) | DBN (in mm) | NNOLF | COPO | COPO_link_state_ | BOPO |
|---|---|---|---|---|---|---|---|---|---|
| MON1 | MON | X1, Y1 | A1:DP B1:UP C1:BP | B1 | MON1-ION1: C1; MON1-ION3: C2; | MON1-ION1; MON1-ION3 | Copo-1 | DP-Y; UP-Y; | Bopo-1 Bopo-2 Bopo-3 |

TABLE 1-continued

| ON_ID | NT | LC | DFC (in mm) | DFF (in mm) | DBN (in mm) | NNOLF | COPO | COPO_link_state_ | BOPO |
|---|---|---|---|---|---|---|---|---|---|
| ION1 | ION | X2, Y2 | A2 | B2 | ION1-MON1: C1; ION1-ION2: C3; ION1-ION3: C4; | | Copo-2 | DP-Y; UP-Y; | Bopo-4 Bopo-5 |
| ION2 | ION | X3, Y3 | A3 | B3 | ... | ... | Copo-3 | DP-Y; UP-Y; | Bopo-6 |
| ION3 | ION | X4, Y4 | A4 | B4 | ... | ... | Copo-4 | DP-Y; UP-Y; | Bopo-7 Bopo-8 |
| ... | ... | ... | ... | ... | ... | ... | ... | ... | ... |
| IONn | ION | X5, Y5 | An | B5 | ... | ... | Copo-5 | DP-Y; UP-Y; | Bopo-9 Bopo 10 |
| SON1 | SON | X6, Y6 | A6 | B6 | ... | ... | Copo-6 | DP-Y; UP-Y; | Bopo 11 Bopo 12 |
| SON2 | SON | X7, Y7 | A7 | B7 | ... | ... | Copo-7 | DP-Y; UP-Y; | Bopo 13 Bopo 14 |

Figure 11:
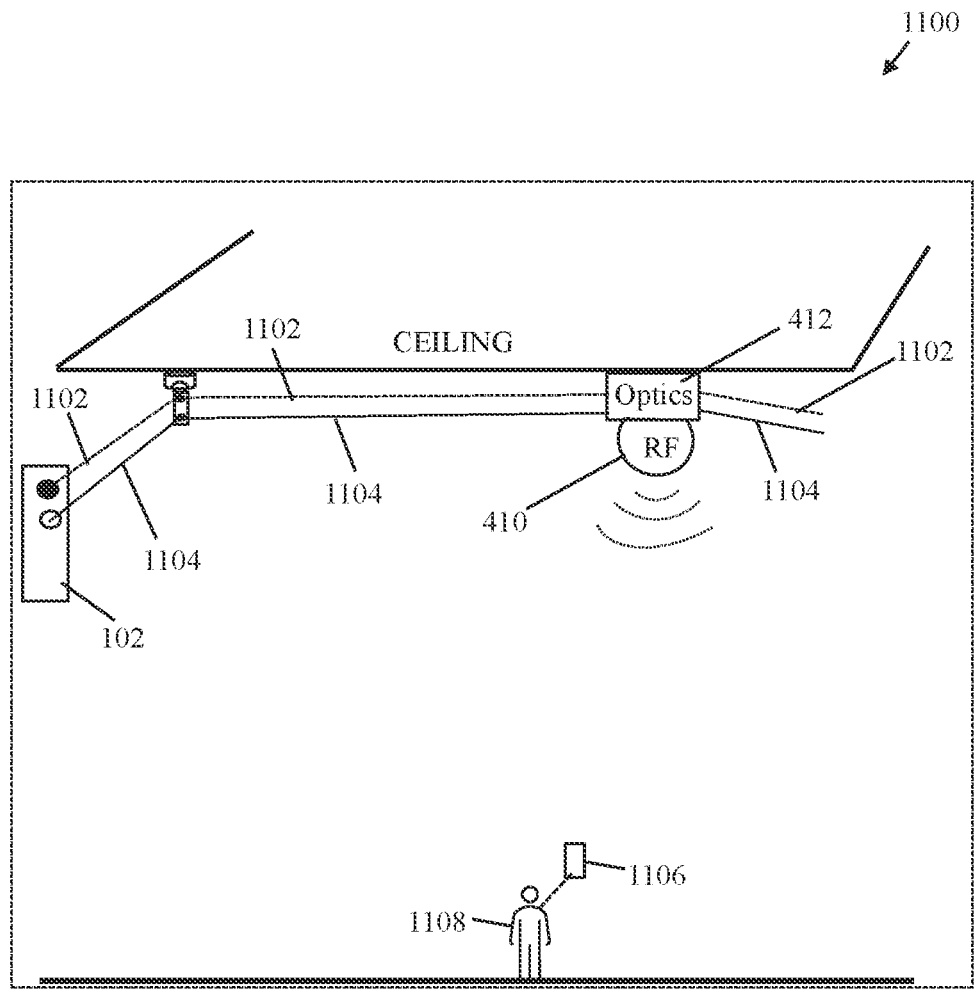
FIG. 11 is a diagram illustrating a free-space optical backhaul constructed with one laser beam for both downstream and upstream communication, in accordance with an embodiment of the disclosure.

In the exemplary routing table of TABLE 1:

"ON_ID" refers to optical node unique identifier;

"NT" refers to optical node type, which indicates whether the optical node is a master optical node (MON) (i.e., the master communication device 102), an intermediate optical node (ION) (i.e., one of the plurality of optical routing devices 104), or a service optical node (SON) (i.e., one of the one or more service communication devices 106);

"LC" refers to location coordinates of each of the plurality of optical nodes 124;

"DFC" refers to a distance from ceiling; more specifically, distance of one or more optical points in each optical node from its mounting surface, i.e., the ceiling surface, where the one or more optical points may include a first optical point (i.e., a Downstream path Point (DP)), a second optical point (i.e., a Beacon Point (BP)) and a third optical point (i.e., an Upstream path Point (UP)) at each optical node, where the first optical point may refer to a laser beam transmission or deflection point or a laser beam detection point that lies in an optical path corresponding to downstream communication from MON→IONs→SON; the second optical point may refer to a beacon laser in visible light spectrum used for alignment or for free-space optical power transmission for charging of the rechargeable battery 314, and the third optical point may refer to a laser beam transmission point, a laser beam deflection point, or a laser beam detection point that lies in an optical path corresponding to upstream communication from SON→IONs→MON; In some cases, the Downstream path Point (DP) and the Upstream path Point (UP) at each optical node may be same (e.g., as shown in FIG. 11).

Figure 8:
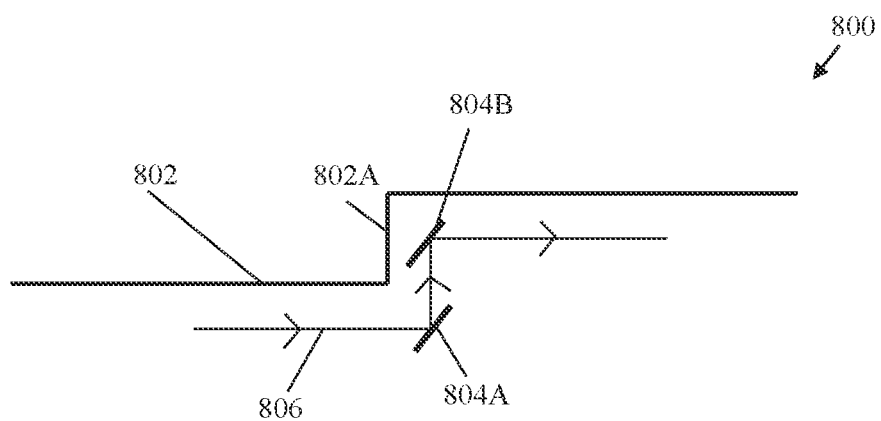
FIG. 8 is a diagram illustrating an optical alignment between two optical nodes of a communication system for ultra-flexible and ultra-reliable laser beam based wireless communication for indoor use, in accordance with an embodiment of the disclosure.

"DFF" refers to distance from floor, i.e., a distance of each of the plurality of optical nodes 124 from the floor; this distance may be used to identify if at certain portions the distance between ceiling surface and floor surface is not same, which in turn may be used to plan alignment of optical path between two optical nodes of the plurality of optical nodes 124 (e.g., ceiling with steps, as shown in FIG. 8 in an example;

"DBN" refers to distance between nodes, i.e., a distance between any two neighbouring optical nodes in the defined indoor area 112;

"NNOLF" refers to neighbouring nodes optical link feasibility, which indicates how many neighbouring optical nodes are available around of each optical node of the plurality of optical nodes 124 and out of the available neighbouring optical nodes, which optical nodes may be used to feasibly form a point-to-point free-space laser link for constructing a free-space optical backhaul;

"COPO" refers to current optical path option, which indicates a current point-to-point free-space laser link from a given optical node with at least one of its neighbouring optical node;

"COPO_link_state" indicates if the current optical path option at both the downstream path (DP) and the upstream path (UP) is active (Y) or not-active (N); and "BOPO" refers to back-up optical path options 514B, which indicates an alternative point-to-point free-space laser link that can be formed by a given optical node with another neighbouring optical node in an event the current optical path option (COPO) is interrupted. In accordance with an embodiment, the processor 502 may be configured to determine the DFC, the DFF, the DBN, the NNOCF, the COPO, the COPO link state, and the BOPO 514B.

In accordance with an embodiment, the forming of the laser beam-based wireless communication network, i.e., the second communication network 120, in the defined indoor area 112 may comprise constructing a free-space optical backhaul by establishing a point-to-point free-space laser link between each pair of optical nodes of the plurality of optical nodes 124. The free-space optical backhaul refers to a wireless backhaul that utilizes free-space optical communication to transport voice, video, and data traffic by establishing the point-to-point free-space laser link between each pair of optical nodes of the plurality of optical nodes 124. For example, the processor 502 may cause the master communication device 102 to obtain a first data signal from the data source 114A or the modem 114B (FIG. 1). The data source 114A or the modem 114B may be used to provide an Internet connection from an Internet service provider or from a core network of a telecommunication network. The first data signal may comprise wireless network data. Thereafter, the processor 502 may be further configured to cause the master communication device 102 to modulate the first data signal into the first laser beam 326A (FIG. 3B). The first data signal may be modulated into the first laser beam 326A using one or more of an intensity modulation, a phase modulation, a frequency modulation, and a polarization modulation. In intensity modulation, the intensity or power of the first laser beam 326A may be varied in accordance with the data to be transmitted. For example, if the data to be transmitted is a digital signal with two levels (0 and 1), the laser beam can be turned ON and OFF at a high frequency to represent a "1" and left "ON" continuously for a defined period to represent a "0". The master communication device 102 may include the laser handling system 220 that includes the laser transmitter 222 (e.g., a laser diode) and the modulation circuit 226. The laser transmitter 222 (e.g., the laser diode) may be used to generate the first laser beam 326A, and the modulation circuit 226 may be configured to modulate the intensity and/or any one of: a phase, frequency, or a polarization of the first laser beam 326A in accordance with the data to be transmitted. The phase of the first laser beam 326A refers to a relative timing of the peaks and troughs of the electromagnetic waves that make up the first laser beam 326A. The phase of the first laser beam 326A may be controlled and manipulated through various known techniques, such as using phase masks or introducing certain changes in the path that the first laser beam 326A travels through. In another example, wavelength division multiplexing (WDM) may be employed to modulate data in the first laser beam 326A. For instance, the first laser beam 326A may be generated at a specific wavelength, where data modulated in the first laser beam 326A at the specific wavelength may be extracted by a detector (i.e., a laser detector 422 of FIG. 4) of the service communication device 106A that is sensitive to the specific wavelength of the first laser beam 326A. In another example, multiple streams of data may be modulated and transmitted concurrently using WDM at different wavelengths to increase the capacity of the first laser beam 326A that may be transmitted in a downstream path in a laser-based wireless communication link towards the service communication device 106A.

In yet another example, a frequency shifting operation may be used to modulate the first signal into the first laser beam 326A. In this case, the frequency of the first laser beam 326A may be shifted slightly up or down to encode data. The shift in frequency may be achieved using a variety of methods, such as modulating the current that drives the laser transmitter 222 of the laser handling system 220 in the master communication device 102. Although the shift in frequency may be achieved by a device called an acousto-optic modulator, however, it is observed that as the acousto-optic modulators can only work up to a few hundred MHz so they cannot be used to carry Gigabit(s) per Second (Gbps) data. In another example, a wavelength hopping operation may be performed, where the wavelength of the first laser beam 326A may be rapidly switched between different values to encode data, such as the first signal. The switching may be executed, for example, by use of a device called a diffraction grating. Although microelectromechanical system (MEMS) mirror may be used for wavelength hopping operation but the issue with MEMS mirror is that like the acousto-optic modulators, MEMS mirror generally do not respond at Gbps rates.

In yet another example, the polarization of the first laser beam 326A may be used to encode data. For example, the first laser beam 326A may be linearly polarized in different directions to represent different data bits. In yet another example, the intensity of the first laser beam 326A may be modulated to encode the first signal (i.e., data signal). For example, the first laser beam 326A may be turned on and off at different frequencies to represent different data bits.

Thereafter, the processor 502 may be further configured to cause the master communication device 102 to direct the first laser beam 326A carrying the first data signal in a downstream path to a service communication device, such as the service communication device 106A, via the plurality of optical routing devices 104.

In the present disclosure, unlike the conventional systems, the master communication device 102 do not require any intermediate RF routers or satellite routers in order to reach to remote end-user devices, such as the end-user devices 108A and 108B, such as the plurality of end-user devices 108. In other words, data do not need to traverse through multiple intermediate routers that increase latency and reduce bandwidth to reach to the remote client devices, such as the plurality of end-user devices 108. The master communication device 102 that includes the laser handling system 220 may further include the laser transmitter 222 that emits the first laser beam 326A carrying one or more first data signals towards, for example, the optical routing device 104A. In other words, the processor 502 may be further configured to cause the master communication device 102 to direct the first laser beam 326A carrying the one or more first data signals in a downstream path over the constructed free-space optical backhaul to the one or more service communication devices 106 via the plurality of optical routing devices 104. The first laser beam 326A may be emitted in a non-visible light spectrum when in operation, where the first laser beam 326A may be kept near to the ceiling surface and may run parallel to the ceiling surface in the defined indoor area 112. The optical routing device 104A may deflect (e.g., like a mirror) the first laser beam 326A carrying the one or more first data signals to another optical routing device 104B, without any processing of the received first laser beam 326A carrying the one or more first data signals. In other words, an angle, and a direction of the first laser beam 326A may change when the first laser beam 326A strikes the optical routing device 104A. The optical routing device 104B may further deflects the first laser beam 326A further towards the service communication device 106A if the service communication device 106A is in a line-of-sight (LOS) to the optical routing device 104B. The present optical path from the master communication device 102 to the optical routing device 104A, and further from the optical routing device 104A to the optical routing device 104B, and further from the optical routing device 104B to the service communication device 106A may be a downstream free-space optical communication path of the current optical path option (COPO). The processor 502 may be further configured to determine which optical routing device(s) among the plurality of optical routing devices 104 to be selected to direct the first laser beam 326A carrying the one or more first data signals in the downstream path. For instance, the processor 502 may be further configured to select the optical routing device 104A among the plurality of optical routing devices 104 to direct a first free-space laser beam (i.e., the first laser beam 326A) from the master communication device 102 carrying the one or more first data signals in the downstream path. The processor 502 may be further configured to calibrate an angle of projection of the first free-space laser beam (i.e., the first laser beam 326A) from a reference point of the master communication device 102 to direct the first free-space laser beam (i.e., the first laser beam 326A) carrying the one or more first data signals in the downstream path towards the determined optical routing device 104A. Other factors that may be considered include an alignment with the downstream path to maintain the alignment of the first laser beam 326A and a beam width handling capability of an optical routing device. A narrow pencil laser beam may be used in the form of the first laser beam 326A to generate laser beam-based communication links between two optical nodes (i.e., starting from the master communication device 102 to the optical routing device 104A, followed by a laser beam-based communication link between two optical routing devices 104A and 104B, and other successive optical routing devices until it reaches to the service communication device 106A in the downstream path).

In accordance with an embodiment, the processor 502 may be further configured to cause the service communication device 106A to detect the first laser beam 326A carrying the one or more first data signals in the downstream path. The service communication device 106A may include a laser detector (the laser detector 422 of FIG. 4) to detect the first laser beam 326A carrying the first data signal in the downstream path. In an example, the laser detector may be implemented as a photodiode or a phototransistor to detect the presence of the first laser beam 326A by converting the optical energy into an electrical current. In some implementation, an optical filter may be used to filter out any unwanted light, allowing only the desired laser wavelength to pass through to the laser detector to improve the signal-to-noise ratio and increase the accuracy of the detection. In some implementation, a feedback may be generated by the service communication device 106A under the control of the processor 502 by measuring a strength of the first laser beam 326A allowing for the detection of the presence of first laser beam 326A even if it is slightly misaligned with the laser detector. In such a case, the feedback may be used to automatically select another optical routing device from among the plurality of the optical routing devices 104 to maintain the laser beam based wireless connectivity and service continuity with the one or more end-user devices 108A and 108B of the plurality of end-user devices 108. The feedback may be communicated to the master communication device 102 which then communicates the feedback to the cloud server 116. Alternatively, the feedback may be communicated to the cloud server 116 directly, for example, using radio frequency (RF) communication network that may use existing RF-based Wi-Fi® network.

In accordance with an embodiment, the processor 502 may be further configured to cause the service communication device 106A to demodulate the one or more first data signals from the first laser beam 326A and distribute one or more wireless signals to the one or more end-user devices 108A and 108B of the plurality of end-user devices 108. The demodulation may depend on the modulation technique used during the modulation of the one or more first data signals from the first laser beam 326A. For example, in some cases, the one or more first data signals may be present in a RF carrier wave, which may be modulated together (RF carrier wave along with data) at the master communication device 102 without extracting the one or more first data signals as baseband signals from the RF carrier wave. In such a case, at the service communication device 106A, the RF carrier wave along with the one or more first data signals may be demodulated at the service communication device 106A by the demodulation circuit 426. Thereafter, the RF carrier wave along with the one or more first data signals may be passed to the front-end RF circuitry 414 of the service communication device 106A, from where the one or more first data signals are distributed as RF signals (i.e., as Wi-Fi® signals over RF carrier frequency at 2.5-7 GHZ or may be beamformed in RF medium at 5G carrier frequency). In another example, the one or more first data signals may be received by the master communication device 102 via an optical fibre connection. In such a case, a free-space optical converter that may be an optical component that plugs into a SFP (small form-factor pluggable) module and converts the one or more first data signals from a fibre port (e.g., of the SFP module) to one or more free space optical beams, such as the first laser beam 326A. In such a case, the one or more first data signals remain in baseband form in the first laser beam 326A, which may be easily and quickly recovered at the service communication device 106A by the laser detector 422 and passed directly to the front-end RF circuitry 414 of the service communication device 106A, from where the one or more first data signals are distributed as RF signals (i.e., as Wi-Fi® signals over RF carrier frequency at 2.5-7 GHZ or may be beamformed in RF medium at 5G carrier frequency). In yet another example, the demodulation of the first data signal from the first laser beam 326A may be carried out using one or more known demodulation methods in free-space optics communication. For example, using direct detection, a coherent detection, a Frequency-shift keying (FSK) demodulation, a Phase-shift keying (PSK) demodulation, an Amplitude shift keying (ASK) demodulation, and the like.

In accordance with an embodiment, the processor 502 may be further configured to cause the service communication device 106A to obtain one or more second data signals from one or more end-user devices 108A and 108B and re-transmit the obtained one or more second data signals over a second laser beam 326B in an upstream path to the master communication device 102 via the plurality of optical routing devices 104. The one or more second data signals may be data signals received over RF waves from the one or more end-user devices 108A and 108B. The service communication device 106A may be further configured to extract user data (i.e., data signals) and modulate the extracted user data into the second laser beam 326B, which is then transmitted to the master communication device 102 via the plurality of optical routing devices 104. The processor 502 may be further configured to cause the master communication device 102 to receive the second laser beam 326B carrying one or more second data signals of one or more end-user devices 108A and 108B in an upstream path over the constructed free-space optical backhaul from the one or more service communication devices 106 via the plurality of optical routing devices 104. The first laser beam 326A and the second laser beam form a laser backhaul in the defined indoor area 112 controlled by cloud server 116 in coordination with the master communication device 102 and the plurality of optical routing devices 104 and one or more service communication devices 106, such as the service communication device 106A. Advantageously, instead of a single laser beam handing both downstream and upstream communication that require certain synchronizations, such as time and/or frequency synchronization to route data from source to destination and back from destination to the source, the communication system 100 bifurcates the downstream path and the upstream path physically, i.e., by having two different laser beams (the first laser beam 326A and the second laser beam 326B). Thus, if one wavelength of the first laser beam 326A is employed for downstream path (e.g., for download) and another wavelength of the second laser beam is employed for routing back towards the master communication device 102, then there is even no need to have time division duplexing (TDD), thereby reducing latency and increasing data throughput rate in the formed laser beam-based wireless communication network, i.e., the second communication network 120, in the defined indoor area 112. Thus, the forming of the laser beam-based wireless communication network in the defined indoor area 112 may further comprise causing the one or more service communication devices 106 to serve one or more end-user devices 108A and 108B wirelessly over one or more RF data links, in which upstream and downstream communication with the one or more end-user devices 108A and 108B by the one or more service communication devices 106 may be routed through the constructed free-space optical backhaul.

Alternatively, in some embodiments, instead of using two different laser beams, the processor 502 may be further configured to cause the master communication device 102 to perform both upstream and downstream data communication over the constructed free-space optical backhaul via one optical path through the plurality of optical routing devices 104 to the one or more service communication devices 106. In such a case, the upstream data and the downstream data may be segregated using WDM or TDD.

In accordance with an embodiment, the one or more first data signals from the first laser beam 326A may be recovered by the service communication device 106A and distributed into a plurality of different radio frequency (RF) signals associated with different communication protocols having different communication ranges (e.g., BLUETOOTH™, Wi-Fi® TM, Li-Fi, a citizens broadband radio service (CBRS) signal, and/or a wireless personal area network (WPAN) signal) to serve the one or more end-user devices 108A and 108B in accordance with their wireless communication capabilities. The one or more service communication devices 106 may be further configured to pack the content received from its corresponding end-user devices and transmit upstream over the second laser beam 326B to the master communication device 102 via the plurality of the optical routing devices 104. In some implementations, the service communication device 106A may include not only an antenna for Wi-Fi® signals communication but also for communication in other personal area network (PAN) signals, such as BLUETOOTH™, a citizens' broadband radio service (CBRS) signal, and/or a wireless personal area network (WPAN) signals. In accordance with an embodiment, the service communication device 106A may be further configured to pack the content received from the one or more end-user devices 108A and 108B and transmit upstream over the second laser beam 326B using WDM to the master communication device 102.

The forming of the laser beam-based wireless communication network, i.e., the second communication network 120, in the defined indoor area 112 may further comprise establishing a radio frequency (RF) supervisory link between each pair of optical nodes of the plurality of optical nodes 124 for a network monitoring and control function. Each of the plurality of optical nodes 124 may have an RF adaptor, configured to pick RF signals (e.g., Wi-Fi® or BLUETOOTH™ signals). For example, the RF antenna 218 of the master communication device 102, the RF control signals handler 310 of each optical routing device of the plurality of optical routing devices 104, and the RF antenna 416 of each of the one or more service communication devices 106 may establish a RF network, such as a low energy Wi-Fi network for the network monitoring and control function. In an implementation, each optical node may be configured to transmit or receive control signals over existing Wi-Fi® signals in 2.4 GHz or 5-7 GHz frequency to another optical node. For example, the processor 502 may be further configured to cause the master communication device 102 to communicate instructions in real time or near real time to one or more optical routing devices of the plurality of optical routing devices 104 to change an angle or a direction of deflection of a laser beam in order to switch and align the laser beam to a different destination, such as a new optical routing device from among the plurality of optical routing devices 104. In another implementation, the plurality of optical routing devices 104 may be controlled and networked via a built-in BLUETOOTH™ link. In other words, RF supervisory links may be Bluetooth links or Wi-Fi® links.

In another example, the processor 502 may be further configured to cause the master communication device 102 to send an instruction to the optical routing device 104A via the one or more RF supervisory links to control a movement of the mounting component 302 along with the optical routing component 304 such that an angle or a direction of deflection of one or more laser beams from the optical routing component 304 is changed. Thereafter, the processor 306 of the optical routing device 104A may be configured to direct the movement controller 308 to move the mounting component 302 along with the optical routing component 304. The movement controller 308 enables the optical routing component 304 to be positioned and oriented in one or more angles to reflect a laser beam in one or more specific directions and angles.

In accordance with an embodiment, the processor 502 may be further configured to obtain network monitoring and performance data of the laser beam-based wireless communication network from the master communication device 102. The network monitoring and performance data may comprise two or more of a data throughput rate, a signal-to-noise ratio (SNR), a number of end-user devices connected to the one or more service communication devices 106, a presence of a signal obstruction entity or a signal attenuating entity between any pair of optical nodes of the plurality of optical nodes 124, a change in an optical alignment between any pair of optical nodes of the plurality of optical nodes 124, and an interruption in the point-to-point free-space laser link between any pair of optical nodes of the plurality of optical nodes 124.

In accordance with an embodiment, the processor 502 may be further configured to cause the master communication device 102 to dynamically re-configure the laser beam-based wireless communication network, based on a change in the network monitoring and performance data that is beyond a defined threshold. In an example, transmit laser power from laser transmitters as well as the optical received signal strength indicator (RSSI) at each optical node may be monitored. If transmit laser power has not degraded but the optical RSSI or laser power at the laser detectors indicates a drop in power, then an automatic optical alignment routine may be executed. In an implementation, the processor 502 may be further configured to generate and communicate Laser Beam Network Control (LBNC) instructions to the master communication device 102 based on the network monitoring and performance data. The changes, such as a drop in the performance data may be due to a default in alignment of laser beams between two optical routing devices or between one optical routing device and a service communication device, such as the service communication device 106A, or a new signal obstruction entity obstructs or interferes with the laser beam path. The LBNC instructions may be generated by the LBNC instructions generator 510 in coordination with the laser beam network controller 508. The laser beam network controller 508 is configured to monitor, manage, and remotely control one or more network management functions of the laser beam based wireless communication network (i.e., the second communication network 120) to enhance the network coverage area, bandwidth, reliability, and configurability in which a reconfigurable optical wireless backhaul is achieved.

In accordance with an embodiment, the processor 502 may be further configured to cause the master communication device 102 to instruct at least one optical routing device of the plurality of optical routing devices 104 to dynamically adjust an orientation of a deflecting surface of the at least one optical routing device, based on the LBNC instructions. In an example, the orientation of the one or more laser beam handling regions 318 in the laser beam handling surface 320 of the optical routing component 304 of the at least one optical routing device (e.g., the optical routing device 104A) may be adjusted based on the LBNC instructions received from the master communication device 102 or the cloud server 116. The instruction to control the movement of the mounting component 302 may be received via the one or more RF supervisory links. The processor 502 may be further configured to remotely control switching and re-aligning of the one or more deflected laser beams 326A1 and 326B1 in a real-time or a near real-time to a different destination device based on a change in the angle or the direction of deflection of the one or more laser beams from the optical routing component 304. For example, the one or more deflected laser beams 326A1 and 326B1 may be deflected to a new optical routing device from among the plurality of optical routing devices 104 or a new service device of the one or more service communication devices 106. An example of the change in the laser beam-based communication route or switching from one optical routing device to another is shown and described, for example, in FIG. 6A.

In accordance with an embodiment, the processor 502 may be further configured to cause the master communication device 102 to dynamically change a laser beam-based communication route from the master communication device 102 to a service communication device 106A of the one or more service communication devices 106 by changing a path of laser communication from a first set of optical routing devices to a second set of optical routing devices of the plurality of optical routing devices 104 to reach to the service communication device 106A, based on the LBNC instructions. Such a change in the laser beam-based communication route may be controlled based on a periodic communication of the LBNC instructions. In an implementation, the processor 502 may be configured to utilize the determined back-up optical path options 514B (also referred to as BOPO in Table 1) for each of the plurality of optical routing devices 104 and the plurality of different laser-communication route options to cause the master communication device 102 to dynamically change the laser beam-based communication route.

In accordance with an embodiment, the processor 502 may be further configured to calibrate an optical alignment between each pair of optical nodes of the plurality of optical nodes 124 for the constructing of the free-space optical backhaul.

In accordance with an embodiment, each of the plurality of optical nodes 124 may comprise two or more distinct optical interfaces to handle a plurality of laser beams concurrently, in which a first optical interface may be configured to handle a first free-space laser beam (e.g., the first laser beam 326A) for downstream data communication in a downstream path and a second optical interface is configured to handle a second free-space laser beam (e.g., the second laser beam 326B) for upstream data communication in an upstream path. Beneficially, the two or more distinct optical interfaces are special purpose physical interfaces to handle a plurality of laser beams concurrently segregating download and upload functions via a plurality of distinct laser beams. For example, at the master communication device 102, at least one optical interface, such as the optical interface 228A, may be coupled to the laser transmitter 222 to focus the first free-space laser beam (e.g., the first laser beam 326A) in a defined beam width, such as into a narrow, collimated beam. Another optical interface, such as the optical interface 228B, may be coupled to the laser detector 224 to receive a focused narrow laser beam (i.e., the second laser beam 326B) over the air, for example, from one of the plurality of optical routing device 104. Similarly, each optical routing device, such as the optical routing device 104A, may include the one or more laser beam handling regions 318, to handle the first free-space laser beam (e.g., the first laser beam 326A) for downstream data communication in the downstream path and the second free-space laser beam (e.g., the second laser beam 326B) for upstream data communication in the upstream path. Like the master communication device 102, in each of the one or more service communication device, such as the service communication device 106A, the plurality of optical interfaces 428 are also provided. In an implementation, the processor 502 may be further configured to use separate wavelengths for the first free-space laser beam (e.g., at 1550 nm) and the second free-space laser beam (e.g., at 1300 nm bands) for transmit and receive respectively. Additional wavelength channels (i.e., communication data lanes) in each band may offer a path to increasing the data rate. For example, coarse wavelength division multiplexing (CWDM) may allow up to 18 channels and dense wavelength division multiplexing (DWDM) may allow up to 200 channels.

In accordance with an embodiment, the point-to-point free-space laser link between each pair of optical nodes of the plurality of optical nodes, is in a non-visible light spectrum. The communication free-space laser beams in non-visible light spectrum below ceiling improves aesthetics and reduces visual clutter, as it eliminates the need for physical cables or wires.

In an implementation, the processor 502 may be further configured to use the machine learning model 512 to determine the back-up optical path options 514B that may be fall-back laser-link options for each of the plurality of optical routing devices 104 based on the first sensor data 516, the second sensor data 518 and the location coordinates of the plurality of optical nodes 124. The back-up optical path options 514B for each optical routing device may include location coordinates of each optical routing device and corresponding two or more neighbouring optical routing devices and laser beam alignment information, such as an angle of deflection of a laser beam, a direction of deflection of the laser beam, a beam width of the laser beam, and a laser intensity to be set for the laser beam, between two optical routing devices. The back-up optical path options 514B for each of the plurality of optical routing devices 104 may be used to generate the plurality of different laser-communication route options. There may be different tables used for upstream path and the downstream path.

Figure 6A:
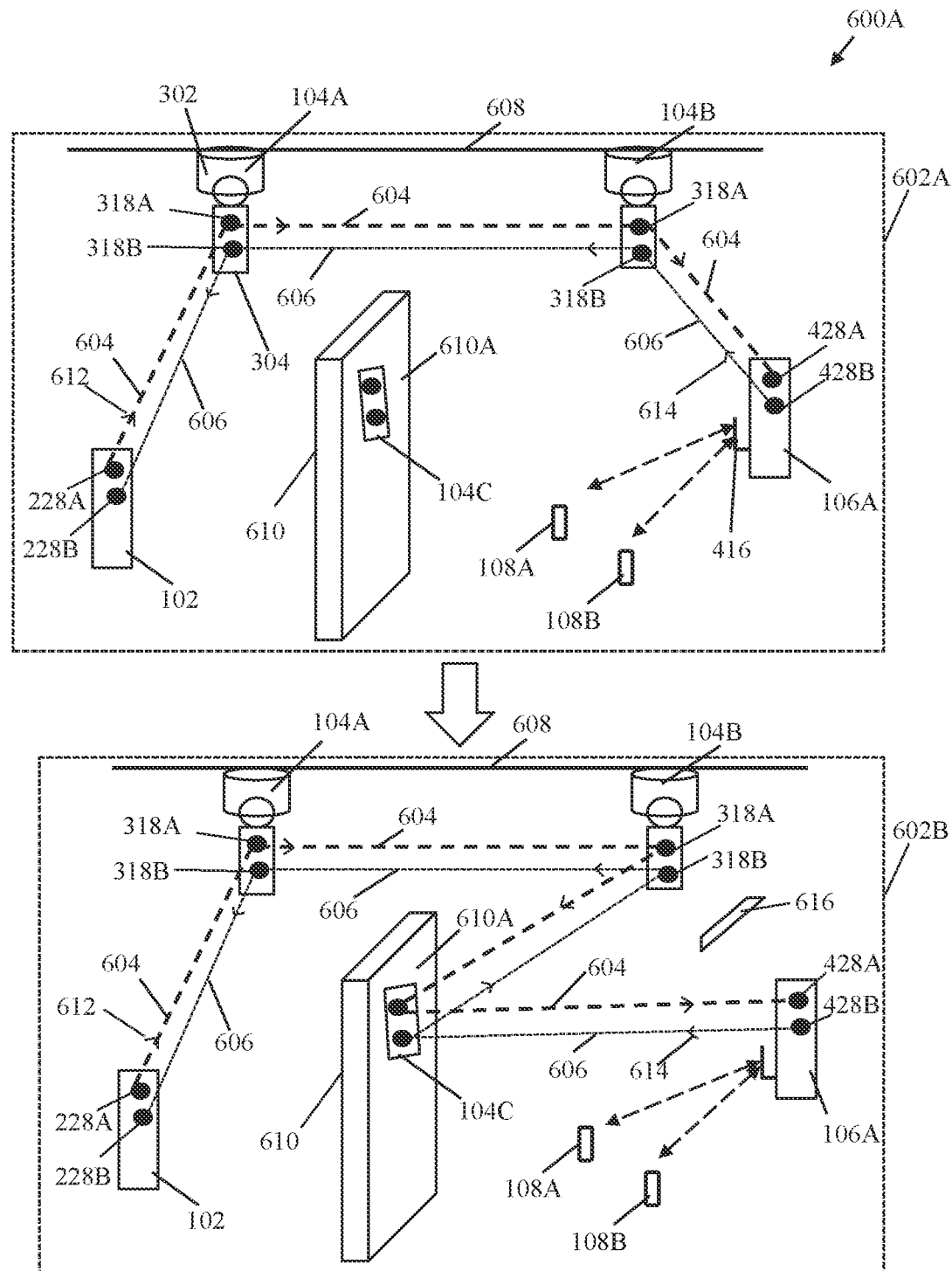
FIG. 6A is a diagram illustrating an exemplary implementation of a communication system with cloud-assisted intelligent free-space optical backhaul for ultra-flexible and ultra-reliable laser beam based wireless communication in an indoor area, in accordance with an exemplary embodiment of the disclosure.

FIG. 6A is a diagram illustrating an exemplary implementation of a communication system with cloud-assisted intelligent free-space optical backhaul for ultra-flexible and ultra-reliable laser beam based wireless communication in an indoor area, in accordance with an exemplary embodiment of the disclosure. FIG. 6A is explained in conjunction with elements from FIGS. 1, 2, 3A-3C, 4, and 5. With reference to FIG. 6A, there is shown an exemplary scenario of a Laser Beam Cascaded Network (LBCN) 600A generated using the plurality of optical routing devices 104, such as the optical routing devices 104A, 104B, or 104C in this case.

In a first scenario 602A, the master communication device 102 is configured to obtain one or more first data signals from the modem 114B via a wired medium, such as an optical fibre. The master communication device 102 may be a modified and intelligent wireless access point that uses existing Wi-Fi® signal in RF medium to control the optical routing devices 104A and 104B and employs laser beams to form the LBCN 600A and communicate data in a cascaded structure via two distinct laser beams to reach to the service communication device 106A (i.e., another modified wireless access point). In the LBCN 600A, the plurality of optical routing devices 104, such as the optical routing devices 104A and 104B are connected in series between the master communication device 102 and the service communication device 106A, as shown, in an example. The mounting component 302 of some of the optical routing devices, such as the optical routing device 104A, may be mounted on a ceiling surface 608. The mounting component 302 may be rotatable in 360 degrees around an axis, such as the X-axis 330A, and may further move along the Y-axis 330B, a vertical axis with respect to the ceiling surface 608), for example, at least 30 degrees up and down with respect to the ceiling surface 608. The optical routing device 104C may be mounted on a wall surface 610A.

In the first scenario 602A, there is an absence of a line-of-sight between the master communication device 102 and the service communication device 106A. Further, there is a presence of a signal obstruction entity 610 between the master communication device 102 and the service communication device 106A. Furthermore, there is a presence of a signal-to-noise ratio (SNR) less than a defined threshold number of decibels is detected at the second location of the service communication device 106A when test radio frequency (RF) signals are communicated from the master communication device 102 via RF waves (e.g., one of the RF antenna 218) in omni-directions.

In the first scenario 602A, each of the plurality of optical nodes 124, such as the master communication device 102, the service communication device 106A, and the optical routing devices 104A, 104B, and 104C, may include one or more sensors 122. The cloud server 116 may be further configured to obtain the first sensor data 516 associated with the defined indoor area 112. The cloud server 116 may be further configured to obtain the second sensor data 518 associated with each of the plurality of optical nodes 124 in the defined indoor area 112. The cloud server 116 may then obtain location coordinates of each of the plurality of optical nodes 124, such as the master communication device 102, the service communication device 106A, and the optical routing devices 104A, 104B, and 104C, directly from each of the plurality of optical nodes 124 or from the master communication device 102. The cloud server 116 may be further configured to cause at least the master communication device 102 to form the LBCN 600A in the defined indoor area 112 based on the obtained location coordinates of each of the plurality of optical nodes 124, the obtained first sensor data 516, and the obtained second sensor data 518. In order to form the LBCN 600A, the cloud server 116 may assist and cause the master communication device 102 to construct a free-space optical backhaul by establishing a point-to-point free-space laser link between each pair of optical nodes of the plurality of optical nodes 124. For example, the free-space optical backhaul may be constructed by using two free-space laser beams (i.e., the first free-space laser beam 604 and the second free-space laser beam 606). In this example, two point-to-point free-space laser links (i.e., the first free-space laser beam 604 and the second free-space laser beam 606) may be established between the master communication device 102 and the optical routing device 104A, and further from the optical routing device 104A to the optical routing device 104B, and further from the optical routing device 104B to the service communication device 106A. Further, in order to form the LBCN 600A, the cloud server 116 may assist and cause the service communication devices 106A to serve one or more end-user devices 108A and 108B wirelessly over one or more RF data links, in which upstream and downstream communication with the one or more end-user devices 108A and 108B by the service communication devices 106A may be routed through the constructed free-space optical backhaul (i.e., the first free-space laser beam 604 in a downstream path 612 and the second free-space laser beam 606 in an upstream path 614). Furthermore, in order to form the LBCN 600A, the cloud server 116 may assist the master communication device 102 to establish a radio frequency (RF) supervisory link between each pair of optical nodes of the plurality of optical nodes 124 for the network monitoring and control function.

In this case, in order to form the LBCN 600A, the cloud server 116 may be further configured to determine the optical routing device 104A among the plurality of optical routing devices 104 to be selected to direct the first free-space laser beam 604 carrying the one or more first data signals in the downstream path 612. The cloud server 116 may be configured to assist the master communication device 102 to calibrate an angle of projection of the first free-space laser beam 604 from a reference point of the master communication device 102 to direct the first free-space laser beam 604 carrying the one or more first data signals in the downstream path 612 towards the determined optical routing device 104A. In this case, the reference point of the master communication device 102 may be an axis orthogonal to the optical interface 228A. Thus, the master communication device 102 via the laser transmitter 222 may be further configured to direct the first free-space laser beam 604 carrying the one or more first data signals in the downstream path 612 for downstream communication to the service communication device 106A via the optical routing devices 104A and 104B. The laser detector 422 of the service communication device 106A may be configured to detect the first free-space laser beam 604 carrying the one or more first data signal in the downstream path 612. The demodulation circuit 426 of the service communication device 106A may be configured to recover the one or more first data signals from the first free-space laser beam 604, and the RF antenna 416 may be configured to distribute the one or more wireless RF signals (e.g., in 5 GHz, 6 GHZ, or 7 GHz frequency) to the one or more end-user devices 108A and 108B. Thereafter, the service communication device 106A (e.g., via the RF antenna 416) may be further configured to obtain one or more second data signals (i.e., RF signals) from the end-user devices 108A and 108B and re-transmit over the second free-space laser beam 606 in an upstream path 614 to the master communication device 102 via the optical routing devices 104A and 104B. The DSP 406 or the demodulation circuit 426 (FIG. 4) may be configured to extract user data from the one or more second RF signals, and the modulation circuit 424 may then re-modulate the extracted user data into the second free-space laser beam 606. The second free-space laser beam 606 may be directed by the laser transmitter 420 (FIG. 4) from the optical interface 428B under the control of the DSP 406 towards the optical routing device 104B, as shown, which is then deflected from the laser beam handling region 318B of the optical routing device 104B to another laser beam handling region 318B of the optical routing device 104A via the LBCN 600A to reach the master communication device 102 for upstream communication. Advantageously, a pair of laser beams such as the first free-space laser beam 604 and the second free-space laser beam 606 that collectively forms the free-space optical backhaul may be concurrently operated in which the first free-space laser beam 604 is used for downstream data communication in the downstream path 612 and the second free-space laser beam 606 is used for upstream communication in the upstream path 614. Similarly, the optical routing component 304 may comprise the one or more laser beam handling regions 318 configured to handle a plurality of laser beams concurrently in which the first free-space laser beam 604 may be deflected via the laser beam handling region 318A of the one or more laser beam handling regions 318 for downstream data communication in the downstream path 612 and the second free-space laser beam 606 is deflected via the laser beam handling region 318A of the one or more laser beam handling regions 318 for upstream data communication in the upstream path 614. Thus, a full coverage with high SNR (e.g., greater than 40 decibels) in different physical spaces is ensured including all nooks and corners of the defined indoor area 112 with high-speed data connectivity to end-user devices, such as the one or more end-user devices 108A and 108B without the need to deploy costly and ineffective conventional intermediate routers with limited bandwidth that process signals, for example, for signal amplification. The concurrent handling of the pair of laser beams such as the first free-space laser beam 604 and the second free-space laser beam 606 for distinct but smooth downstream and upstream data communication improves data transfer rates (e.g., in double digit gigabit rate) between at least two remote wireless communication devices (such as two WAPs) in indoor scenario as compared to existing wireless systems (e.g., conventional wireless local area networks).

Furthermore, the cloud server 116 may be configured to monitor performance data in terms of data rate, signal-to-noise ratio (SNR), a number of end-user devices connected to the service communication device 106A. The master communication device 102 may be further configured to periodically communicate such performance data of the LBCN 600A to the cloud server 116. In an example, transmit laser power from laser transmitters (e.g., the laser transmitter 222 of FIG. 2 and the laser transmitter 420 of FIG. 4) as well as the optical RSSI and laser power at the laser detector 422 at the service communication device 106A may be monitored. If transmit laser power has not degraded but the optical RSSI or laser power at the laser detector 422 indicates a drop in power, then an automatic optical alignment routine is executed.

In a second scenario 602B, there may be some changes in the monitored performance data. The changes, such as a drop in the performance data may be because of a default in alignment of laser beams between the optical routing device 104B and the service communication device 106A, or when the laser transmit power has not degraded but the optical RSSI indicates a drop in power, or a new signal obstruction entity 616 obstructs or interferes with the laser beam path. In such scenarios, a laser beam-based communication route may be dynamically changed from the master communication device 102 to the service communication device 106A by changing a path of laser communication from a first set of optical routing devices 104A and 104B to a second set of optical routing devices 104A, 104B, and 104C to reach to the service communication device 106A. This is done to maintain service continuity to the end-user devices 108A and 108B. The cloud server 116 may control such re-configuration directly at the designated optical node, such as the optical routing device 104B, to re-route to a new optical routing device, such as the optical routing device 104C, or assist the master communication device 102 to perform such re-configuration of the LBCN 600A.

Figure 6B:
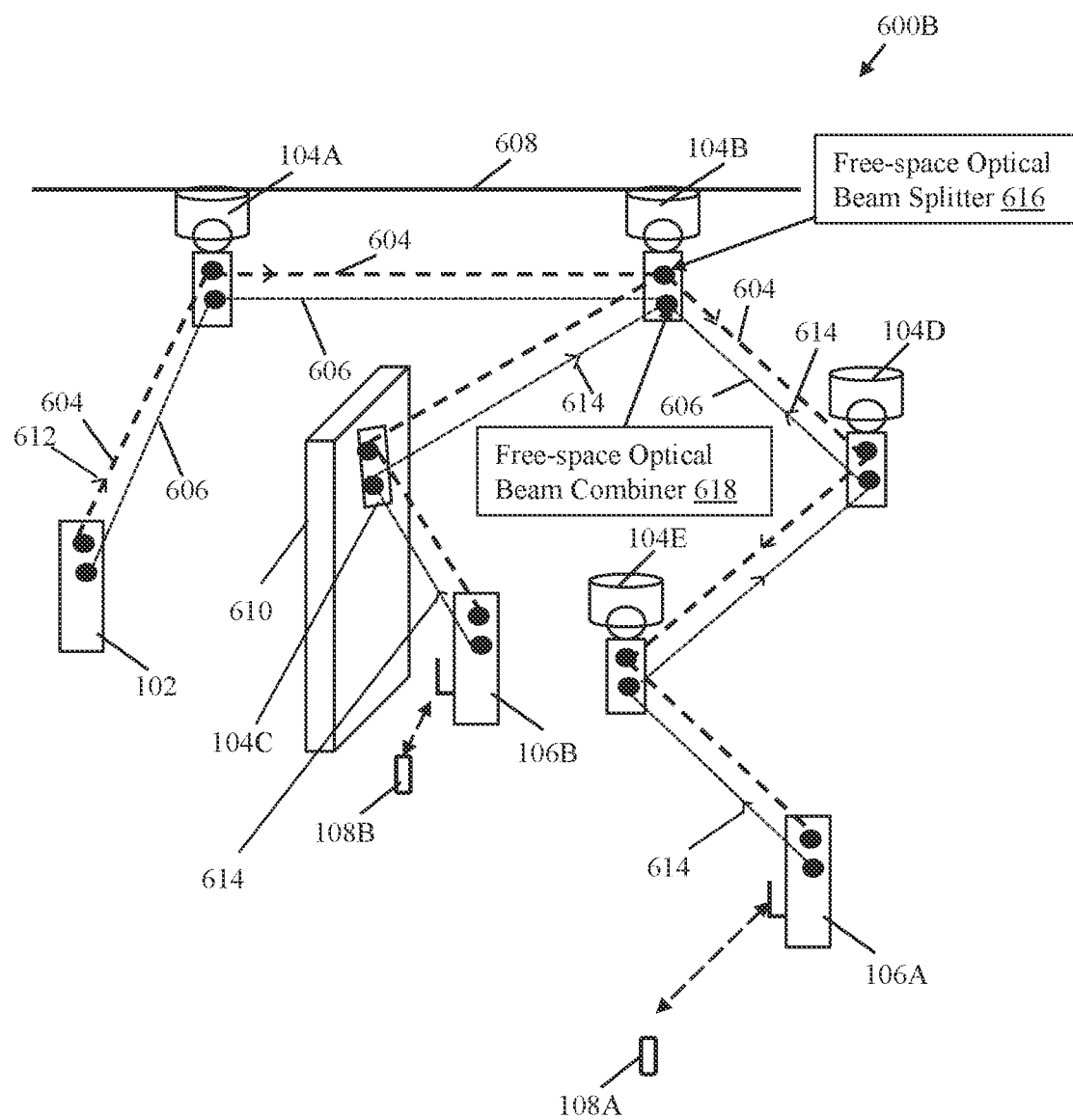
FIG. 6B is a diagram illustrating another exemplary implementation of a communication system with cloud-assisted intelligent free-space optical backhaul for ultra-flexible and ultra-reliable laser beam based wireless communication in an indoor area, in accordance with an exemplary embodiment of the disclosure.

FIG. 6B is a diagram illustrating another exemplary implementation of a communication system with cloud-assisted intelligent free-space optical backhaul for ultra-flexible and ultra-reliable laser beam based wireless communication in an indoor area, in accordance with an exemplary embodiment of the disclosure. FIG. 6B is explained in conjunction with elements from FIGS. 1, 2, 3A-3C, 4, and 5. With reference to FIG. 6B, there is shown an exemplary scenario of a Laser Beam Mesh Network (LBMN) 600B generated using the optical routing devices 104A, 104B, 104C, 104D, and 104E. In this implementation, there are multiple service communication devices, such as the service communication devices 106A and 106B, each servicing its users, such as the end-user device 108A and the end-user device 108B, respectively.

Unlike a typical Wi-Fi® system, where there is only one broadcast device and hence a limited coverage area, there are certain other conventional Wi-Fi® systems that provide comparatively wider coverage by broadcasting from the main router to several satellite routers, which then broadcast to its client devices. The communication between the main router connected to the Internet and the satellite routers fed by the main router may be carried by the Backhaul. In order for the backhaul to not compete with the client devices for network bandwidth, one Wi-Fi® band is typically dedicated to the backhaul in such conventional systems. The reach and performance of these conventional systems and topology are fundamentally limited by the bandwidth of the dedicated band, and by the number of intermediate satellite routers that the data must traverse in order to reach remote client devices. While the backhaul connections can be done with physical cables which offer wider bandwidth than a Wi-Fi® band, cable installation and reconfiguration are extremely costly and slow. Further, conventional mesh Wi-Fi® system performance is heavily affected by the bandwidth of the backhaul and how the system manages the communication between the mesh router and its satellites, i.e., the satellite routers or intermediate routers.

There is another conventional system, like a Gigabit Passive Optical Network (GPON), which is a type of point-to-multipoint network technology that delivers broadband access to the end user devices via fiber optic cable. In the conventional GPON star topology, an optical spitter may be connected to an optical fiber cable, in which upstream traffic is not continuous but composed of bursts (data bursts) as each user is given a time slot on which data can be transmitted. Typically, there are an optical line terminal (OLT), a number of optical network units (ONUs) or optical network terminals (ONTs) near end users, as well as the conventional optical splitter. For downstream communication in the conventional optical networks like GPON, OLT sends frames of data to the conventional optical splitter continuously, and the conventional optical splitter sends the same set of frames to each ONU, and ONU filters out only frames specific to an end-user device and discards all other frames.

There is yet another conventional wireless communication system called Light Fidelity (Li-Fi) that uses visible light to transmit data. However, such conventional systems suffer from interference from ambient light, such as sunlight or artificial light sources, which can interfere with the signal and reduce its quality. Additionally, data modulation is very restrictive resulting in lower bandwidth, data throughput, and reliability of the data recovery at the end user devices. Like in other conventional optical or light-based systems, there is a Line-of-sight requirement, where Li-Fi signals can only be transmitted and received in a direct line-of-sight between the transmitter and receiver, which can limit its versatility and flexibility compared to Wi-Fi® systems, which can transmit signals through walls and other obstacles.

In contract to the conventional systems, in the present disclosure, the cloud server 116 communicates an instruction to the master communication device 102 to cause the optical routing devices 104A, 104B, 104C, 104D, and 104E to dynamically adjust the orientation of their corresponding laser beam handling surface 320 (which includes the one or more laser beam handling regions 318) of the optical routing component 304 to form the LBMN 600B. Although the inherent Line-of-sight requirement exists to establish a point-to-point free-space laser link between each pair of optical nodes of the plurality of optical nodes 124, the flexibility and versatility is achieved in the LBMN 600B by intelligent use of the optical routing devices 104A, 104B, 104C, 104D, and 104E, and the cloud server 116 that is aware of the network environment in the defined indoor area 112 and remotely controls the formation and operation of the LBMN 600B. Further, the master communication device 102 and the service communication devices 106A and 106B are modified to synergistically combine the RF wireless technology with cutting-edge laser communication technology. This unique combination of capabilities offers lightning-fast data transfer speeds (e.g., in multiple gigabytes to even multi terabytes) even for areas where RF signals were previously unavailable with unparalleled security. Beneficially, each of the service communication devices 106A and 106B serve as a bridge between the laser-based data transmission and the RF-based wireless communication network, and where advantageously in the laser-based data transmission, continuous upstream data traffic and downstream data traffic is achieved with significantly increased throughput rate throughout the LBMN 600B.

In an implementation, the LBMN 600B may be generated based on instructions received from the cloud server 116. Based on the instructions received from the cloud server 116, the master communication device 102 via the laser transmitter 222 may be further configured to direct the first free-space laser beam 604 carrying the one or more first data signals in the downstream path 612 for downstream communication to the service communication devices 106A and 106B via the LBMN 600B. A laser beam-based communication route in the downstream path 612 and the upstream path 614 from the master communication device 102 to the service communication device 106A in the LBMN 600B may be via the optical routing devices 104A, 104B, 104D, and 104E. In this case, in the downstream path 612, the optical routing device 104B, which is a passive optical node, may include a free-space optical beam splitter 618 (e.g., a plate beam splitter) that splits the received laser beam in the downstream path 612 into two separate laser beams (as shown), where one laser beam from such optical split is directed towards the optical routing device 104D (which may be a passive optical routing device) and the other laser beam from such optical split is directed towards the optical routing device 104C to form the LBMN 600B. In an implementation, such split by the free-space optical beam splitter 618 may cause the received laser beam in the downstream path 612 in a first wavelength to split into two separate laser beams having same wavelengths (i.e., the first wavelength). In another implementation, such optical split by the free-space optical beam splitter 618 may cause the received laser beam in the downstream path 612 in a first wavelength to split into two separate laser beams having different wavelengths. Further, in this case, in the upstream path 614, the optical routing device 104B may further include a free-space optical beam combiner 620 (e.g., a plate beam combiner) that combines two received laser beams (one each from the optical routing devices 104D and 104C) in the upstream path 614 into a single laser beam (as shown) to form the LBMN 600B for upstream data communication. Similarly, another laser beam-based communication route in the downstream path 612 and the upstream path 614 from the master communication device 102 to the service communication device 106B in the LBMN 600B may be via the optical routing devices 104A, 104B, and 104C. The processor 306 may be further configured to receive an instruction via the one or more RF supervisory links to control a movement of the mounting component 302 along with the optical routing component 304 such that an angle or a direction of deflection of one or more laser beams from the optical routing component is changed. The optical routing component 304 may comprise the one or more laser beam handling regions 318 configured to handle a plurality of laser beams concurrently in which the first free-space laser beam 604 may be deflected via the laser beam handling region 318A of the one or more laser beam handling regions 318 for downstream data communication in the downstream path 612 and a second free-space laser beam 606 is deflected via the laser beam handling region 318A of the one or more laser beam handling regions 318 for upstream data communication in the upstream path 614. Alternatively, the optical routing component 304 may be configured to handle one laser beam over-the-air in the laser-beam based wireless communication network for both downstream and upstream data communication with the master communication device 102 and the one or more service communication devices 106, such as the service communication devices 106A and 106B. In other words, there are two ways of communication to form the laser-beam based wireless backhaul (i.e., the laser-beam based wireless communication network). In a first implementation, there may be two laser beams (the first free-space laser beam 604 and second free-space laser beam 606) for a free-space laser communication with separate transmission (Tx) and reception (Rx). In a second implementation, there may be single laser beam for Tx and Rx but at two different wavelengths using WDM. The wavelength splitting and combining may be performed passively using a dichroic mirror. Thus, a full coverage with high signal-to-noise (SNR) in an indoor area with high-speed data connectivity and continuous upstream and downstream data traffic to end-user devices, such as the end-user device 108A and 108B may be provided without the need to deploy conventional intermediate routers simplifying the deployment while significantly improving the data throughput, security, and network reliability as compared to conventional systems.

Figure 7A:
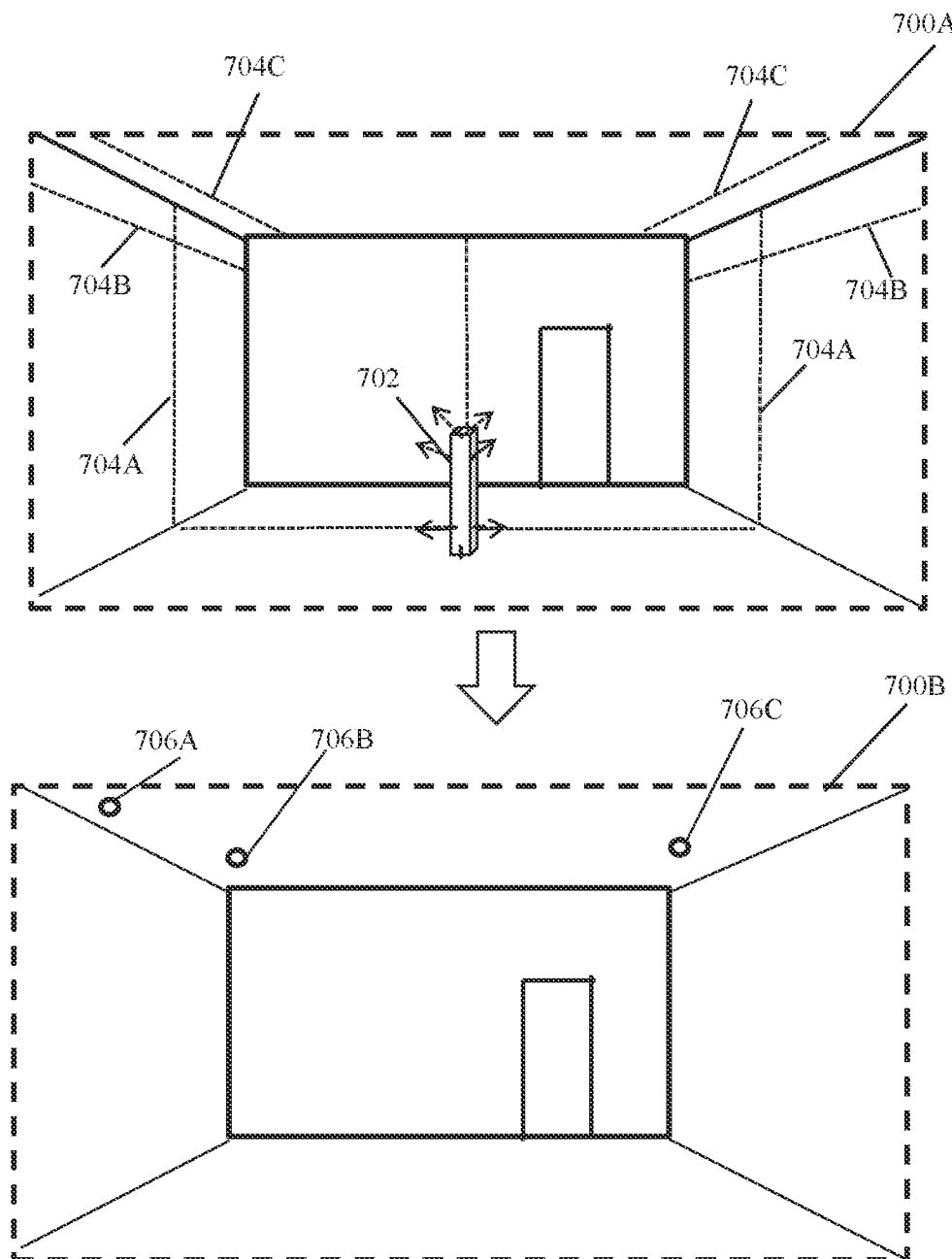
FIGS. 7A, 7B, and 7C, collectively are diagrams illustrating mounting of optical nodes and optical alignment between different pairs of optical nodes of a communication system, in accordance with an embodiment of the disclosure.
Figure 7B:
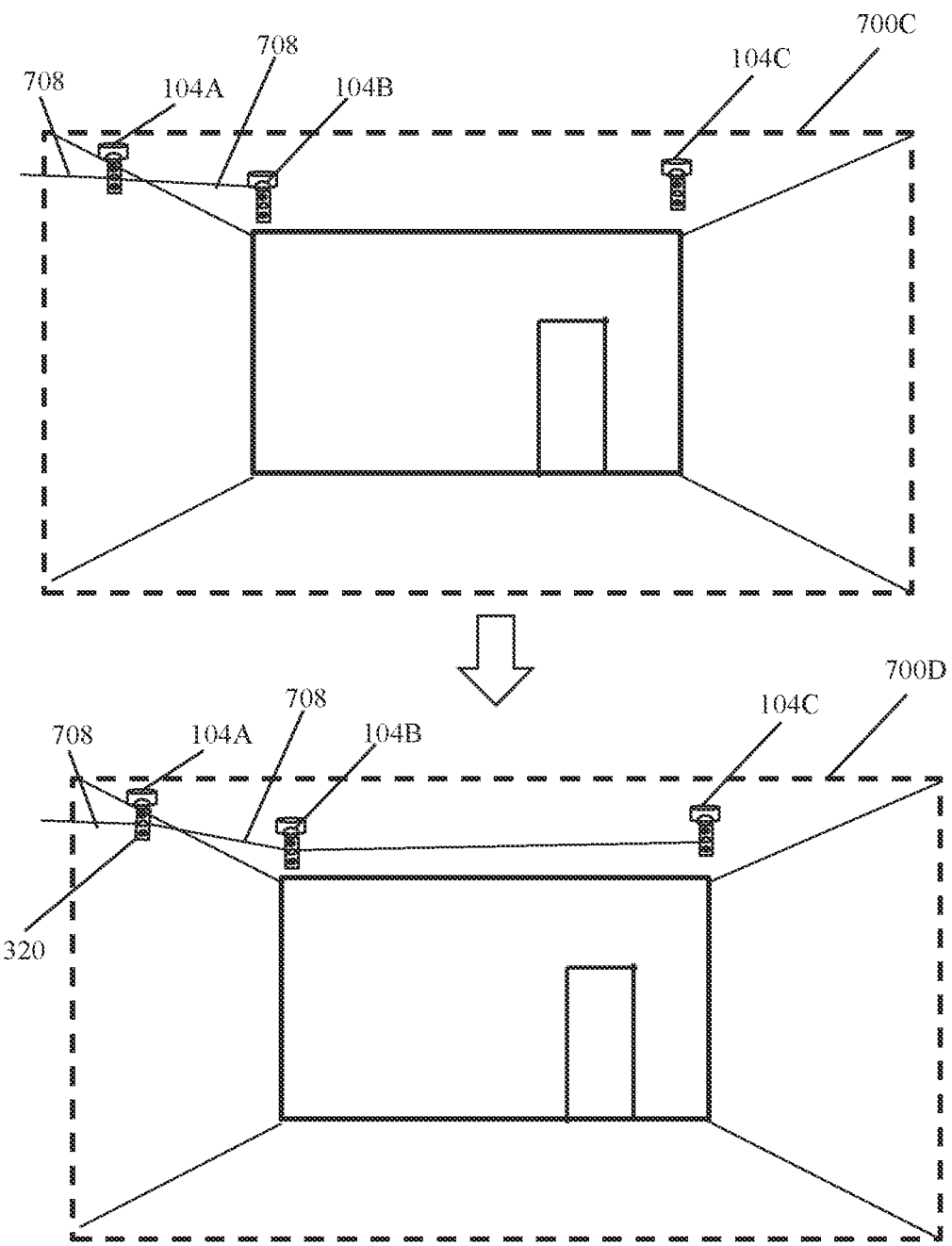
Figure 7C:
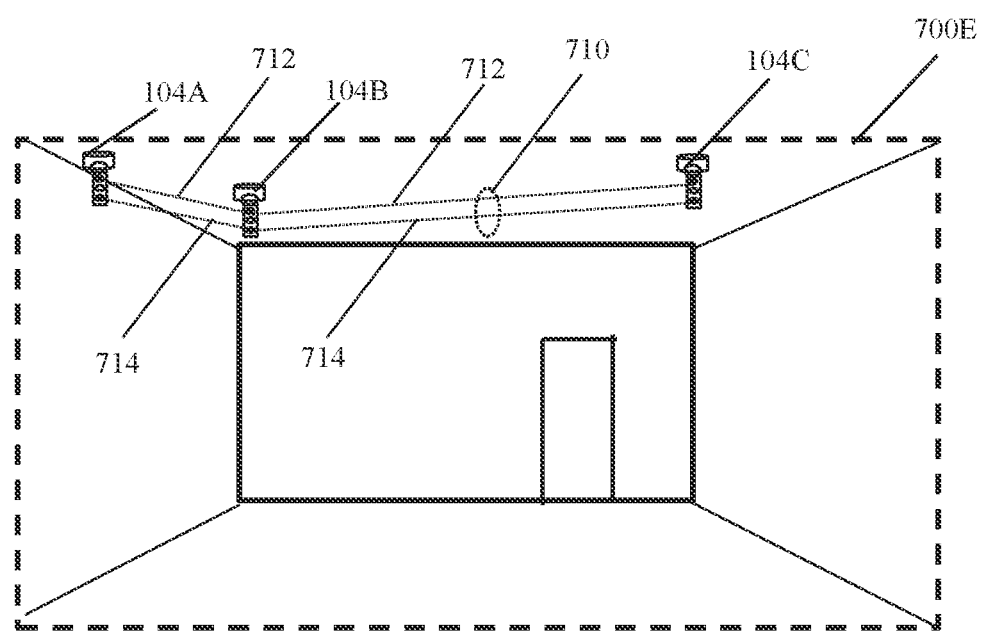

FIGS. 7A, 7B, and 7C, collectively are diagrams illustrating mounting of optical nodes and optical alignment between different pairs of optical nodes of a communication system, in accordance with an embodiment of the disclosure. FIGS. 7A to 7C are explained in conjunction with elements from FIGS. 1, 2, 3A to 3C, 4, 5, 6A, and 6B. With reference to FIG. 7A, there is shown a first scenario 700A and a second scenario 700B.

In the first scenario 700A, there is shown a laser levelling device 702 (i.e., a laser leveller) in a defined indoor area 112 (e.g., an interior of a building). The laser levelling device 702 may be configured to project laser guides, for example, in the form of straight lines on the walls and ceiling in the defined indoor area 112. For example, vertical laser guides 704A on walls, horizontal laser guides 704B on walls near the ceiling surface, and further the horizontal laser guides 704C on the ceiling surface may be used to guide the mounting of one or more of the plurality of optical nodes 124. The one or more sensors 122 or the image-capture device 110 (FIG. 1) may be configured to capture a video or images of the defined indoor area 112 with the vertical laser guides 704A on walls, horizontal laser guides 704B on walls near the ceiling surface, and further the horizontal laser guides 704C, and such sensor data as a part of the first sensor data 516 may be communicated to the cloud server 116.

In the second scenario 700B, the cloud server 116 may be configured to obtain the first sensor data 516 associated with the defined indoor area 112. For example, the cloud server 116 may be configured to process the first sensor data 516 (e.g., the video or images of the defined indoor area 112) to determine a plurality of different points 706A, 706B, and 706C in the defined indoor area 112 where some of the plurality of optical routing devices 104 may be placed.

With reference to FIG. 7B, there is shown the defined indoor area 112 in which the optical routing devices 104A, 104B, and 104C are mounted on the determined plurality of different points 706A, 706B, and 706C in the defined indoor area 112. There is further shown an initial coarse alignment using the first sensor data 516 between each pair of optical nodes of the plurality of optical nodes 124, such as the optical routing devices 104A, 104B, and 104C, in this case, in an example.

In a third scenario 700C, the cloud server 116 may be configured to perform a coarse alignment using the first sensor data 516 between each pair of optical nodes of the plurality of optical nodes 124, such as the master communication device 102 (not shown in FIG. 7B) and the optical routing devices 104A, 104B, and 104C. The cloud server 116 may be further configured to obtain the second sensor data 518 associated with each of the plurality of optical nodes 124 in the defined indoor area 112. The second sensor data 518 may be obtained by the measurements and sensor output from the one or more sensors 122 that may be in-built in each of the plurality of optical nodes 124 or connected to each of the plurality of optical nodes 124. The cloud server 116 may cause the master communication device 102 (not shown) to direct a beacon laser beam 708 in a visible light spectrum to the optical routing device 104A in the defined indoor area 112 to align an optical path. The beacon laser beam 708 may be a directed by the OWPT component 236 that may serve dual-purpose of initial optical alignment as well as for an optical wireless power transmission to remotely charge the rechargeable battery 314 of the optical routing devices 104A. The optical routing device 104A may then deflect the beacon laser beam 708 to other optical routing device 104B, but the initial alignment between the optical routing device 104A and the optical routing device 104B may not be proper. At each optical node, transmitted laser power may be monitored as well as the optical RSSI. If laser power has not degraded but the optical RSSI indicates a drop in power or no power, then an automatic optical alignment routine may be executed, as shown the fourth scenario 700D.

In the fourth scenario 700D, the optical RSSI and transmit laser power may be monitored and reported back to the master communication device 102 or the cloud server 116 (hosting network management software) via a radio frequency (RF) wireless connectivity, i.e., the more radio frequency (RF) supervisory links between each of the plurality of optical nodes 124 that are mounted and are operational. The cloud server 116 may be further configured to cause the master communication device 102 to instruct the optical routing device 104B to dynamically adjust an orientation of the laser beam handling surface 320 of the optical routing device 104B in order to automatically and precisely re-align to the optical path of the beacon laser beam 708 deflected from the optical routing device 104B and further to the optical routing device 104C. Such realignment may be a fine alignment based on the first sensor data 516 and the second sensor data 518.

With reference to the FIG. 7C, there is shown a free-space optical backhaul 710 constructed between the plurality of optical nodes 124, such as the master communication device 102 (not shown) and the optical routing devices 104A, 104B, and 104C, and further to the service communication device 106A (now shown). The cloud server 116 may be further configured to form a laser beam-based wireless communication network in the defined indoor area 112 by constructing the free-space optical backhaul 710 in which a point-to-point free-space laser link between each pair of optical nodes of the plurality of optical nodes 124. In this exemplary scenario 700E, two point-to-point free-space laser links 712 and 714 for upstream and downstream communication may be established between each pair of optical nodes of the plurality of optical nodes 124, such as the master communication device 102 (not shown) and the optical routing devices 104A, 104B, and 104C, and further to the service communication device 106A (now shown) to maintain an end-to-end connectivity in the laser-beam based wireless network.

FIG. 8 is a diagram illustrating an optical alignment between two optical nodes of a communication system for ultra-flexible and ultra-reliable laser beam based wireless communication for indoor use, in accordance with an embodiment of the disclosure. FIG. 8 is explained in conjunction with elements from FIGS. 1, 2, 3A-3C, 4, 5, 6A-6B, and 7A-7C. With reference to FIG. 8, there is shown an exemplary scenario 800 that includes a ceiling 802 with a step 802A. In such an exemplary scenario 800, the step 802A may cause an obstruction in an optical path between a pair of optical nodes of the plurality of optical nodes 124. Thus, in such a case, mirrors 804A and 804B may be placed at an appropriate angle, for example, about 45 degrees angle in this case, to create a continuity of a laser beam 806 in its optical path may be maintained between the pair of optical nodes.

Figure 9:
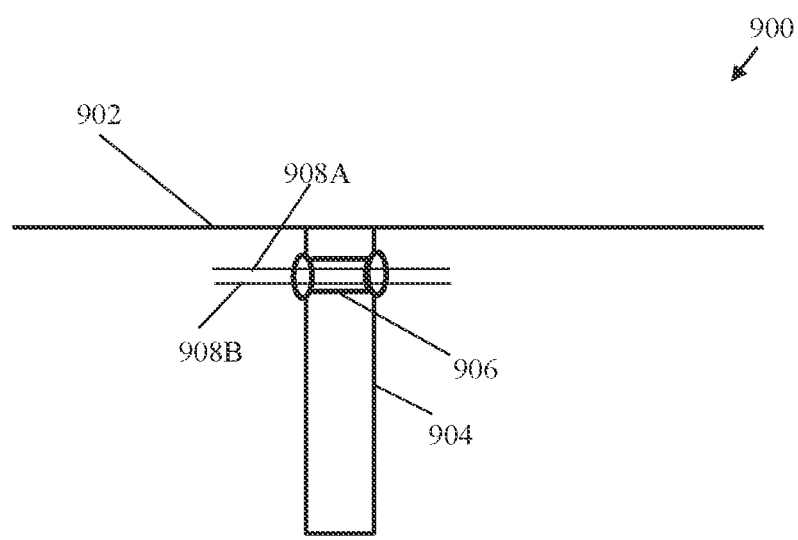
FIG. 9 is a diagram illustrating an optical alignment between two optical nodes in a communication system through an obstruction for ultra-flexible and ultra-reliable laser beam based wireless communication for indoor use, in accordance with an embodiment of the disclosure.

FIG. 9 is a diagram illustrating an optical alignment between two optical nodes through an obstruction in a communication system for ultra-flexible and ultra-reliable laser beam based wireless communication for indoor use, in accordance with an embodiment of the disclosure. FIG. 9 is explained in conjunction with elements from FIGS. 1, 2, 3A-3C, 4, 5, 6A-6B, and 7A-7C. With reference to FIG. 9, there is shown an exemplary scenario 900 that includes a ceiling 902 with an obstruction 904, for example, a wall or any other obstruction in the ceiling 902. There is further shown an optical grommet 906 mounted across a length of the drill hole in the obstruction 904. The optical grommet 906 may be made of plastic or glass material, which provides a safe optical passage for one or more laser beams, such as laser beams 908A and 908B though the obstruction 904 (e.g., through walls or any other obstruction). The optical grommet 906 is a new custom-built module (e.g., a hollow cylindrical glass module), for effective laser beam-based wireless communication, that allows laser beams to pass through it while preventing any dust particles or spider net that may otherwise partially block a drill hole over the period of time affecting the optical path of the one or more laser beams, such as laser beams 908A and 908B.

Figure 10:
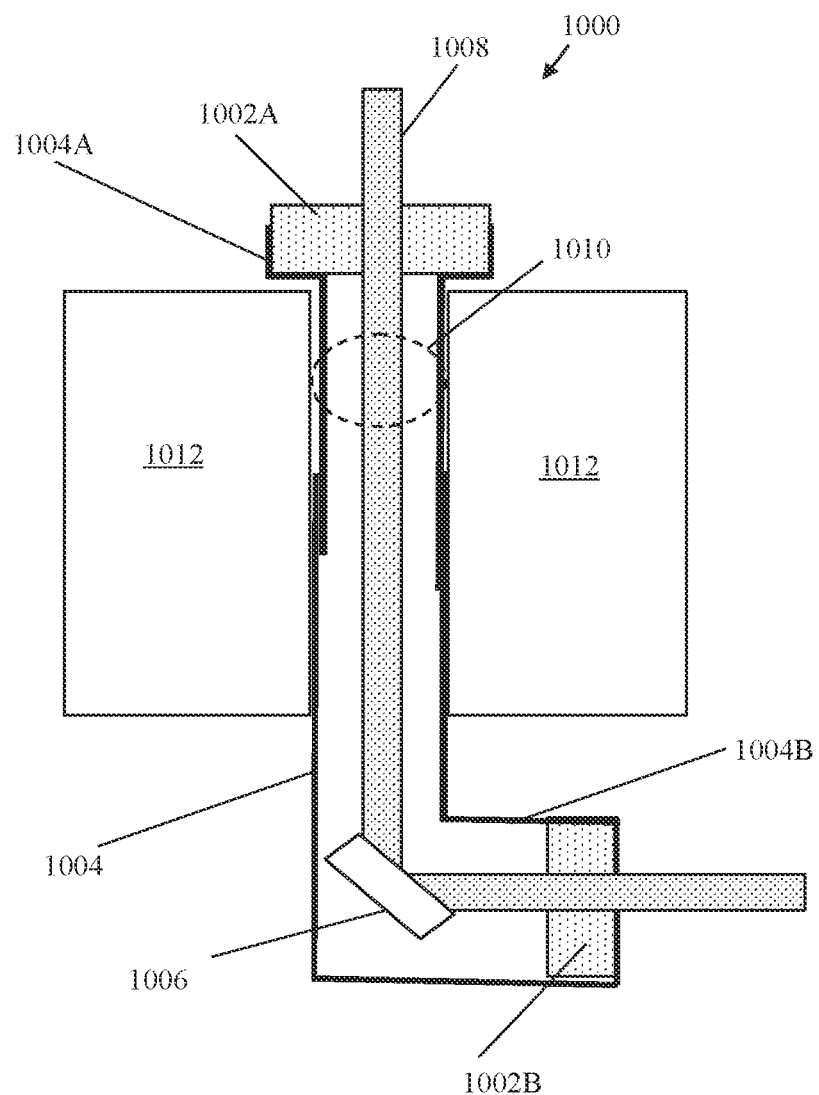
FIG. 10 is a diagram illustrating an optical alignment between two optical nodes in a communication system through an obstruction for ultra-flexible and ultra-reliable laser beam based wireless communication for indoor use, in accordance with another embodiment of the disclosure.

FIG. 10 is a diagram illustrating an optical alignment between two optical nodes in a communication system through an obstruction for ultra-flexible and ultra-reliable laser beam based wireless communication for indoor use, in accordance with another embodiment of the disclosure. FIG. 10 is explained in conjunction with elements from FIGS. 1, 2, 3A-3C, 4, 5, 6A-6B, 7A-7C, 8, and 9. With reference to FIG. 10, there is shown an optical grommet 1000 that includes a first glass layer 1002A, a second glass layer 1002B, a sleeve 1004, and a mirror plate 1006. In an implementation, the first glass layer 1002A the second glass layer 1002B may be coated with anti-reflection coating. The sleeve 1004 may be made of glass or plastic material. The sleeve 1004 may have a hollow cylindrical body with open ends where the first glass layer 1002A may be mounted at one end and the second glass layer 1002B may be mounted at the other end. In this case, the sleeve 1004 may be a two-part body (a first sleeve part 1004A and a second sleeve part 1004B) coupled with each other such that a length of the sleeve 1004 may be adjusted according to the length of a drill hole 1010 in an obstruction 1012 (e.g., a floor, a wall, or a ceiling). The sleeve 1004 may be different shapes, for example, an elongated cylindrical shaped body, an elongated rectangular shaped body, or an elongated square shaped body, where both parts of the two-part body in combination may form an elbow shape, a T-shape, a L-shape, or a straight I-shape, and the like. For instance, both parts may be straight, or at least one part (e.g., the first sleeve part 1004A) of the two-part body may be straight, and other part (e.g., the second sleeve part 1004B) may be an elbow shaped body bent at approximately 90-degree angle, or both parts may be an elbow shaped body. In this case, when a laser beam 1008 strikes the first glass layer 1002A, the laser beam 1008 is reflected by the mirror plate 1006 and exits from the second glass layer 1002B and vice-versa. Thus, an optical passage may be created between two floors (e.g., useful in a multi-story building) or through walls, or through ceilings, or any other obstruction by use of the optical grommet 1000 to create the laser-beam based wireless communication network.

FIG. 11 is a diagram illustrating a free-space optical backhaul constructed with one laser beam for both downstream and upstream communication, in accordance with an embodiment of the disclosure. FIG. 11 is explained in conjunction with elements from FIGS. 1, 2, 3A-3C, 4, 5, 6A-6B, 7A-7C, 8, 9, and 10. With reference to FIG. 11, there is shown an exemplary scenario 1100 that depicts a free-space optical backhaul constructed by one laser beam 1102 instead of two laser beams among the plurality of optical nodes 124, such as the master communication device 102, the optical routing device 104A, and the service communication device 106A. The laser beam 1102 may be communicated in non-visible light spectrum, for example, in the range of 900-1600 nm wavelength, or specifically at 1300 or 1550 nm. There is further shown a beacon laser beam 1104 directed by the master communication device 102 in a visible light spectrum (e.g., 500 to 700 or 800 nm) for an optical wireless power transmission to remotely charge the rechargeable battery 314 (FIGS. 3A and 3C) of the optical routing device 104A and the rechargeable battery 440 of the service communication device 106A as well as to perform an optical alignment or monitor the optical alignment periodically. The service communication device 106A may include the front-end optical section 412 for handling the laser beams, such as the laser beam 1102 and the beacon laser beam 1104, and further the front-end RF section 410 to distribute data streams carried by the laser beam 1002 via RF signals to one or more end-user devices, such as the smartphone 1106 of a user 1108. The data streams may be demodulated from the laser beam 1002 by the service communication device 106A and distributed to the one or more end-user devices, such as the smartphone 1106, to perform both upstream and downstream communication. Thus, in this case, a single laser beam, such as the laser beam 1102, may be employed for Tx and Rx but at two different wavelengths using WDM.

Figure 12A:
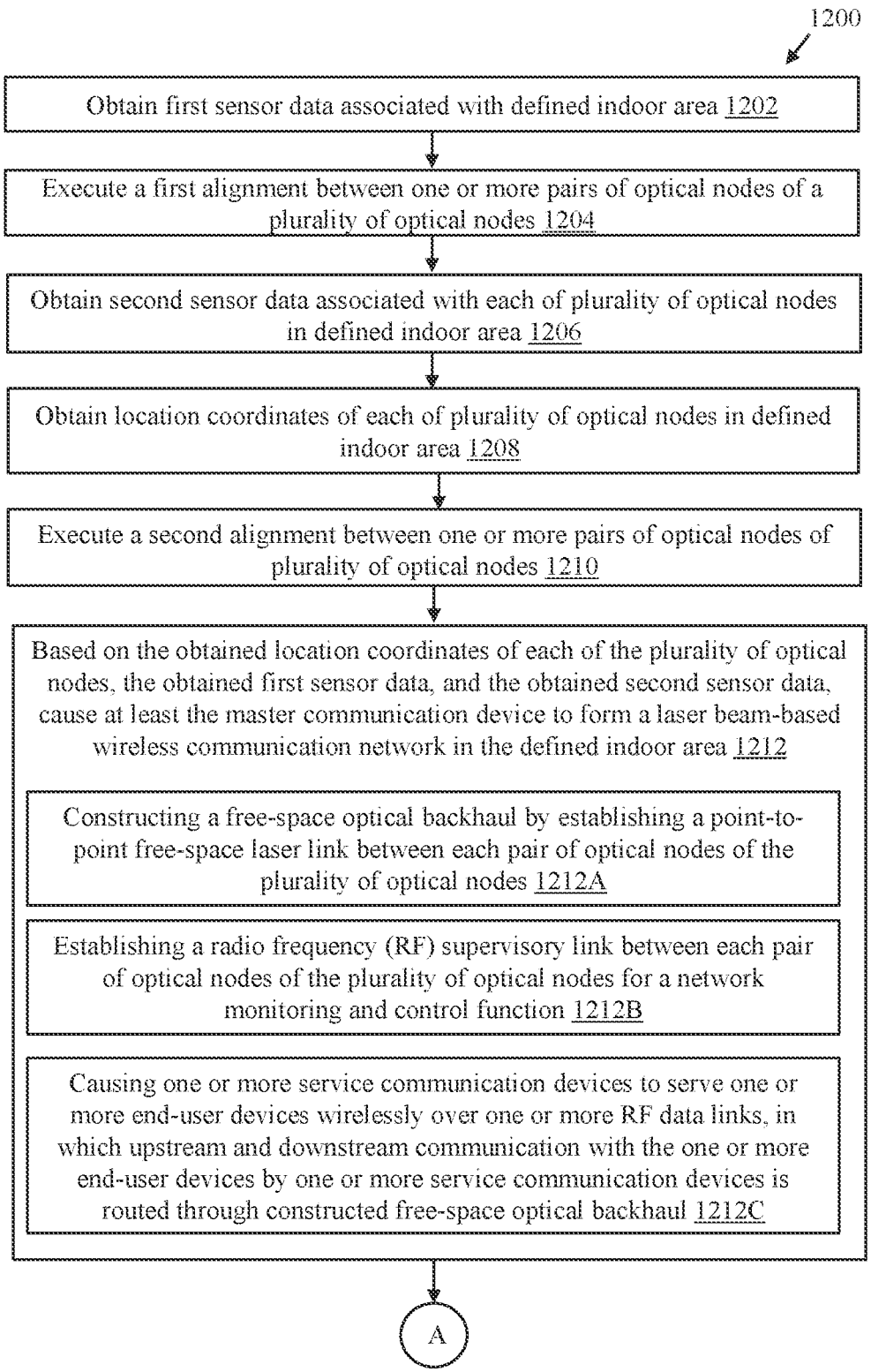
FIGS. 12A, 12B, and 12C, collectively, is a flowchart that illustrates an exemplary communication method for a cloud-assisted intelligent free-space optical backhaul for an ultra-flexible and an ultra-reliable laser beam based wireless communication, for example, in an indoor area, in accordance with an embodiment of the disclosure.
Figure 12B:
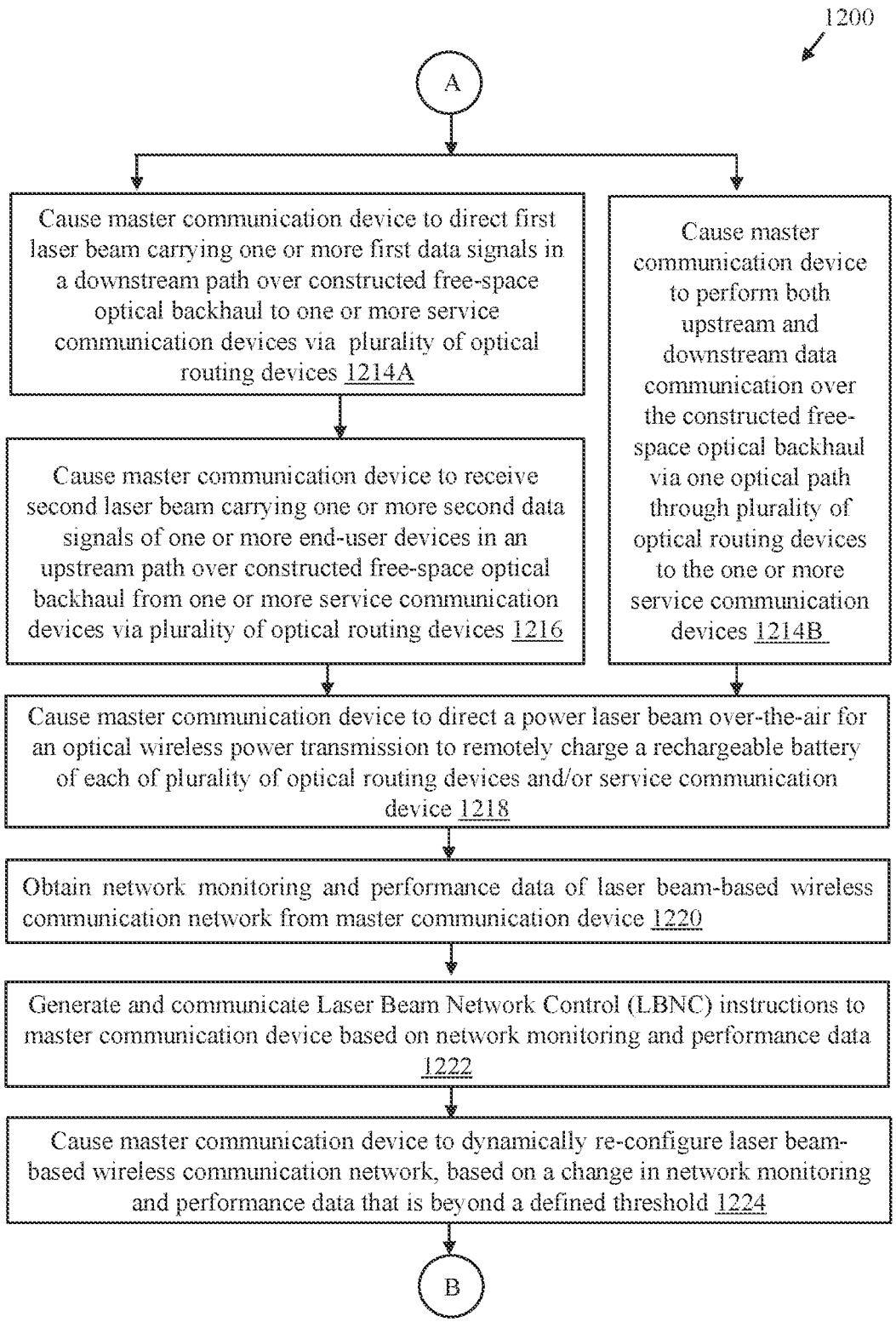
Figure 12C:
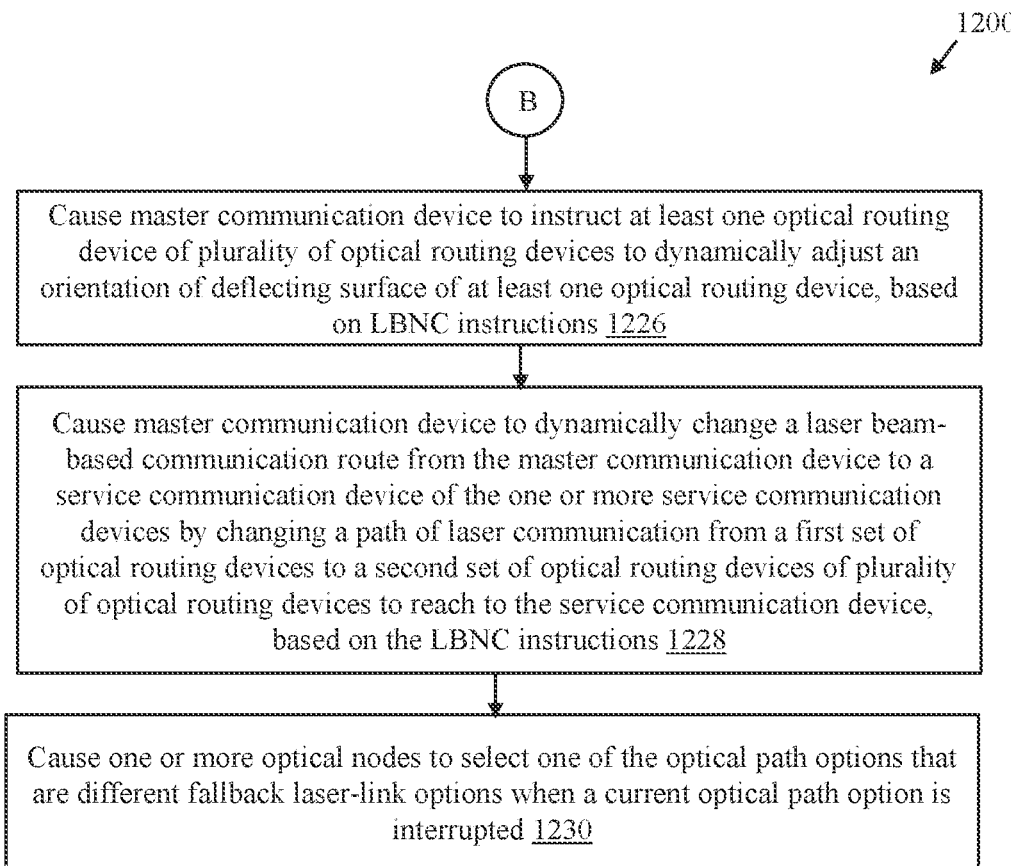

FIGS. 12A, 12B, and 12C, collectively, is a flowchart that illustrates an exemplary communication method for a cloud-assisted intelligent free-space optical backhaul for an ultra-flexible and an ultra-reliable laser beam based wireless communication, for example, in an indoor area, in accordance with an embodiment of the disclosure. FIGS. 12A, 12B, and 12C are explained in conjunction with elements from FIGS. 1, 2, 3A-3C, 4, 5, 6A-6B, 7A-7C, and 8-11. With reference to FIGS. 12A, 12B, and 12C there is shown a flowchart 1200 comprising exemplary operations 1202 through 1230. The operations 1202 to 1230 may be executed by the cloud server 116.

At 1202, the first sensor data 516 associated with the defined indoor area 112 may be obtained. The first sensor data 516 may comprise one or more of: a three-dimensional (3D) map of the defined indoor area, a two-dimensional (2D) or a 3D layout plan of the defined indoor area 112, a point cloud of physical structures in the defined indoor area 112, one or more images of the defined indoor area 112, a video of the defined indoor area 112, or other visual data of the defined indoor area 112.

At 1204, a first alignment may be executed between one or more pairs of optical nodes of the plurality of optical nodes 124. The first alignment may refer to a coarse alignment, described in detail, for example, in FIG. 5.

At 1206, the second sensor data 518 associated with each of the plurality of optical nodes 124 in the defined indoor area 112 may be obtained. The second sensor data 518 may comprise one or more of a unique identifier of each optical node of the plurality of optical nodes 124, a direction of pointing of a laser transmitter of each optical node, a direction of pointing of a laser detector of each optical node, an angle of projection or deflection of a laser beam with respect to a reference surface at each optical node, a three-dimensional (3D) position coordinate of each optical node, a measured temperature surrounding each optical node, a roll rotation value along a z-axis of each optical routing device of the plurality of optical routing devices, a pitch rotation value along an x-axis that is parallel to a mounting surface of each optical routing device, a yaw rotation value of each optical routing device along a y-axis orthogonal to the x-axis, and location information of one or more end-user devices in the defined indoor area 112.

At 1208, location coordinates of each of the plurality of optical nodes 124 in the defined indoor area 112 may be obtained. The cloud server 116 may be configured to obtain the location coordinates directly form the plurality of optical nodes 124 or via the master communication device 102 that acts as a hub device for sensor data transmission.

At 1210, a second alignment may be executed between one or more pairs of optical nodes of the plurality of optical nodes 124. The second alignment may refer to a fine alignment, discussed in detail, for example, in FIG. 5.

At 1212, the master communication device 102 may be caused to form a laser beam-based wireless communication network (i.e., the second communication network 120) in the defined indoor area 112 based on the obtained location coordinates of each of the plurality of optical nodes 124, the obtained first sensor data 516, and the obtained second sensor data 518. The operation 1212 may include one or more sub-operations, referred to as operations 1212A to 1212C. At 1212A, a free-space optical backhaul may be constructed by establishing a point-to-point free-space laser link between each pair of optical nodes of the plurality of optical nodes 124. At 1212B, a radio frequency (RF) supervisory link may be established between each pair of optical nodes of the plurality of optical nodes 124 for a network monitoring and control function. In some implementation, the RF supervisory link may be established before the operation 1204. At 1212C, the one or more service communication devices 106 may be caused to serve one or more end-user devices wirelessly over one or more RF data links, in which upstream and downstream communication with the one or more end-user devices by the one or more service communication devices 106 may be routed through the constructed free-space optical backhaul. The control may then pass to 1214A or 1214B.

At 1214A, the master communication device 102 may be caused to direct a first laser beam carrying one or more first data signals in a downstream path over the constructed free-space optical backhaul to the one or more service communication devices 106 via the plurality of optical routing devices 104. The control passes to 1216 from 1214A.

At 1216, the master communication device 102 may be caused to receive a second laser beam carrying one or more second data signals of one or more end-user devices in an upstream path over the constructed free-space optical backhaul from the one or more service communication devices 106 via the plurality of optical routing devices 104. The control passes to 1218.

At 1214B, the master communication device 102 may be caused to perform both upstream and downstream data communication over the constructed free-space optical backhaul via one optical path (one laser beam) through the plurality of optical routing devices 104 to the one or more service communication devices 106. The control passes to 1218.

At 1218, the master communication device 102 may be caused to direct a power laser beam (e.g., the beacon laser beam 708) over-the-air for an optical wireless power transmission to remotely charge a rechargeable battery 314 of each of the plurality of optical routing devices 104 and/or one or more service communication devices 106.

At 1220, network monitoring and performance data of the laser beam-based wireless communication network may be obtained from the master communication device 102.

At 1222, Laser Beam Network Control (LBNC) instructions may be generated and communicated to the master communication device 102 based on the network monitoring and performance data.

At 1224, the master communication device 102 may be caused to dynamically re-configure the laser beam-based wireless communication network, based on a change in the network monitoring and performance data that is beyond a defined threshold.

At 1226, the master communication device 102 may be caused to instruct at least one optical routing device of the plurality of optical routing devices 104 to dynamically adjust an orientation of a deflecting surface of the at least one optical routing device, based on the LBNC instructions.

At 1228, the master communication device 102 may be caused to dynamically change a laser beam-based communication route from the master communication device 102 to the service communication device 106A of the one or more service communication devices 106 by changing a path of laser communication from a first set of optical routing devices to a second set of optical routing devices of the plurality of optical routing devices 104 to reach to the service communication device 106A, based on the LBNC instructions.

At 1230, one or more optical nodes may be caused to select one of the back-up optical path options (BOPO) 514B that are different fallback laser-link options when a current optical path option (COPO) is interrupted.

Various embodiments of the disclosure may provide the communication system 100 (FIG. 1). The communication system 100 may include the cloud server 116 comprising the processor 502, wherein the processor 502 is configured to obtain first sensor data 516 associated with the defined indoor area 112 and obtain second sensor data 518 associated with each of the plurality of optical nodes 124 in the defined indoor area 112, wherein the plurality of optical nodes 124 comprises the master communication device 102, the plurality of optical routing devices 104, and one or more service communication devices 106. The processor 502 is further configured to obtain location coordinates of each of the plurality of optical nodes 124 in the defined indoor area 112. Based on the obtained first sensor data 516, the second sensor data 518, and the location coordinates of each of the plurality of optical nodes 124, the processor 502 is further configured to cause at least the master communication device 102 to form a laser beam-based wireless communication network in the defined indoor area 112. The forming of the laser beam-based wireless communication network in the defined indoor area 112 comprises constructing a free-space optical backhaul by establishing a point-to-point free-space laser link between each pair of optical nodes of the plurality of optical nodes 124 and establishing a radio frequency (RF) supervisory link between each pair of optical nodes of the plurality of optical nodes 124 for a network monitoring and control function.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A communication system, comprising:
a cloud server comprising a processor, wherein the processor is configured to:
obtain first sensor data associated with a defined indoor area;
obtain second sensor data associated with each of a plurality of optical nodes in the defined indoor area, wherein the plurality of optical nodes comprises a master communication device, a plurality of optical routing devices, and one or more service communication devices;
obtain location coordinates of each of the plurality of optical nodes in the defined indoor area; and
based on the obtained first sensor data, the second sensor data, and the location coordinates of each of the plurality of optical nodes, cause at least the master communication device to form a laser beam-based wireless communication network in the defined indoor area,
wherein the forming of the laser beam-based wireless communication network in the defined indoor area comprises:
constructing a free-space optical backhaul by establishing a point-to-point free-space laser link between each pair of optical nodes of the plurality of optical nodes, and
establishing a radio frequency (RF) supervisory link between each pair of optical nodes of the plurality of optical nodes for a network monitoring and control function.

2. The communication system according to claim 1, wherein the forming of the laser beam-based wireless communication network in the defined indoor area further comprises causing the one or more service communication devices to serve one or more end-user devices wirelessly over one or more RF data links, in which upstream and downstream communication with the one or more end-user devices by the one or more service communication devices is routed through the constructed free-space optical backhaul.

3. The communication system according to claim 1, wherein the first sensor data comprises one or more of: a three-dimensional (3D) map of the defined indoor area, a two-dimensional (2D) or a 3D layout plan of the defined indoor area, a point cloud of physical structures in the defined indoor area, one or more images of the defined indoor area, a video of the defined indoor area, or other visual data of the defined indoor area.

4. The communication system according to claim 1, wherein the second sensor data comprises one or more of: a unique identifier of each optical node of the plurality of optical nodes, a direction of pointing of a laser transmitter of each optical node, a direction of pointing of a laser detector of each optical node, an angle of projection or deflection of a laser beam with respect to a reference surface at each optical node, a three-dimensional (3D) position coordinate of each optical node, a measured temperature surrounding each optical node, a roll rotation value along a z-axis of each optical routing device of the plurality of optical routing devices, a pitch rotation value along an x-axis that is parallel to a mounting surface of each optical routing device, a yaw rotation value of each optical routing device along a y-axis orthogonal to the x-axis, and location information of one or more end-user devices in the defined indoor area.

5. The communication system according to claim 1, wherein the laser beam-based wireless communication network is one of a Laser Beam Mesh Network (LBMN) or a Laser Beam Cascaded Network (LBCN).

6. The communication system according to claim 1, wherein the processor is further configured to cause the master communication device to direct a first laser beam carrying one or more first data signals in a downstream path over the constructed free-space optical backhaul to the one or more service communication devices via the plurality of optical routing devices.

7. The communication system according to claim 1, wherein the processor is further configured to cause the master communication device to receive a second laser beam carrying one or more second data signals of one or more end-user devices in an upstream path over the constructed free-space optical backhaul from the one or more service communication devices via the plurality of optical routing devices.

8. The communication system according to claim 1, wherein the processor is further configured to cause the master communication device to perform both upstream and downstream data communication over the constructed free-space optical backhaul via one optical path through the plurality of optical routing devices to the one or more service communication devices.

9. The communication system according to claim 1, wherein the processor is further configured to obtain network monitoring and performance data of the laser beam-based wireless communication network from the master communication device.

10. The communication system according to claim 9, wherein the network monitoring and performance data comprises two or more of: a data throughput rate, a signal-to-noise ratio (SNR), a number of end-user devices connected to the one or more service communication devices, a presence of a signal obstruction entity or a signal attenuating entity between any pair of optical nodes of the plurality of optical nodes, a change in an optical alignment between any pair of optical nodes of the plurality of optical nodes, and an interruption in the point-to-point free-space laser link between any pair of optical nodes of the plurality of optical nodes.

11. The communication system according to claim 9, wherein the processor is further configured to cause the master communication device to dynamically re-configure the laser beam-based wireless communication network, based on a change in the network monitoring and performance data that is beyond a defined threshold.

12. The communication system according to claim 9, wherein the processor is further configured to generate and communicate Laser Beam Network Control (LBNC) instructions to the master communication device based on the network monitoring and performance data.

13. The communication system according to claim 12, wherein the processor is further configured to cause the master communication device to instruct at least one optical routing device of the plurality of optical routing devices to dynamically adjust an orientation of a deflecting surface of the at least one optical routing device, based on the LBNC instructions.

14. The communication system according to claim 12, wherein the processor is further configured to cause the master communication device to dynamically change a laser beam-based communication route from the master communication device to a service communication device of the one or more service communication devices by changing a path of laser communication from a first set of optical routing devices to a second set of optical routing devices of the plurality of optical routing devices to reach to the service communication device, based on the LBNC instructions.

15. The communication system according to claim 1, wherein the processor is further configured to determine an optical routing device among the plurality of optical routing devices to be selected to direct a first free-space laser beam from the master communication device carrying a first data signal in a downstream path.

16. The communication system according to claim 15, wherein the processor is further configured to calibrate an angle of projection of the first free-space laser beam from a reference point of the master communication device to direct the first free-space laser beam carrying the first data signal in the downstream path towards the determined optical routing device.

17. The communication system according to claim 1, wherein the processor is further configured to calibrate an optical alignment between each pair of optical nodes of the plurality of optical nodes for the constructing of the free-space optical backhaul.

18. The communication system according to claim 1, wherein each of the plurality of optical nodes comprises two or more distinct optical interfaces to handle a plurality of laser beams concurrently, and wherein a first optical interface is configured to handle a first free-space laser beam for downstream data communication in a downstream path and a second optical interface is configured to handle a second free-space laser beam for upstream data communication in an upstream path.

19. The communication system according to claim 1, wherein each of the master communication device and each of the one or more service communication devices is a wireless access point, a wireless router, a home gateway device, a fixed wireless access (FWA) device, or a network controller.

20. The communication system according to claim 1, wherein the point-to-point free-space laser link between each pair of optical nodes of the plurality of optical nodes, is in a non-visible light spectrum.

21. A communication method, comprising:
in a cloud server:
obtaining first sensor data associated with a defined indoor area;
obtaining second sensor data associated with each of a plurality of optical nodes in the defined indoor area, wherein the plurality of optical nodes comprises a master communication device, a plurality of optical routing devices, and one or more service communication devices;
obtaining location coordinates of each of the plurality of optical nodes in the defined indoor area; and
based on the obtained first sensor data, and the second sensor data, and the location coordinates of each of the plurality of optical nodes, causing at least the master communication device to form a laser beam-based wireless communication network in the defined indoor area,
wherein the forming of the laser beam-based wireless communication network in the defined indoor area comprises:
constructing a free-space optical backhaul by establishing a point-to-point free-space laser link between each pair of optical nodes of the plurality of optical nodes; and
establishing a radio frequency (RF) supervisory link between each pair of optical nodes of the plurality of optical nodes for a network monitoring and control function.

* * * * *